United States Patent [19]

Iura et al.

[11] Patent Number: 6,157,406
[45] Date of Patent: *Dec. 5, 2000

[54] IMAGE PICKUP APPARATUS AND METHOD OF CONTROLLING THE SAME

[75] Inventors: Noriyuki Iura; Tomoyuki Kurashige; Naoki Yamamoto, all of Yokohama; Takuya Imaide, Fujisawa; Hiroaki Kami, Chigasaki; Yoshihiro Todaka, Yokohama, all of Japan

[73] Assignee: Hitachi, Ltd., Tokyo, Japan

[*] Notice: This patent is subject to a terminal disclaimer.

[21] Appl. No.: 09/184,011

[22] Filed: Nov. 2, 1998

Related U.S. Application Data

[63] Continuation of application No. 08/418,441, Apr. 7, 1995, Pat. No. 5,847,756.

[30] Foreign Application Priority Data

Apr. 8, 1994 [JP] Japan ................................. 6-070431
Jul. 13, 1994 [JP] Japan ................................. 6-160930
Aug. 17, 1994 [JP] Japan ................................. 6-193194

[51] Int. Cl.$^7$ ................................................. H04N 5/225
[52] U.S. Cl. .......................... 348/220; 348/221; 348/363
[58] Field of Search ........................... 348/220, 221, 348/363, 224, 229, 230, 296, 362; 396/235

[56] References Cited

U.S. PATENT DOCUMENTS 5,014,082   5/1991   Farrington .
5,258,848  11/1993   Kondo et al. .
5,382,974   1/1995   Soeda et al. .
5,471,242  11/1995   Kondo .
5,528,291   6/1996   Oda et al. .
5,734,424   3/1998   Sasaki ...................................... 348/220
5,847,756  12/1998   Iura et al. ............................... 348/220

FOREIGN PATENT DOCUMENTS 56-44271    4/1981   Japan .
59-194575  11/1984   Japan .
60-143073   7/1985   Japan .
63-114487   5/1988   Japan .
2-288679   11/1990   Japan .

Primary Examiner—Wendy Garber
Assistant Examiner—Aung S. Moe
Attorney, Agent, or Firm—Antonelli, Terry, Stout & Kraus, LLP

[57] ABSTRACT

An image pickup apparatus capable of generating a motion picture and a still picture. An amount of exposure in a still imaging mode is increased as compared with the amount of exposure for mode is increased as compared with the amount of exposure for one field in the motion picture imaging mode, preferably twice as large as the latter. In the still picture mode, electric charges are swept out from a CCD by an exposure control simultaneously with closing of a diaphragm for adjusting the amount of exposure. Upon occurrence of error in the closing operation of the diaphragm, the amount of exposure in the still picture mode is set to a design value. On the basis of difference between the design value and an actually measured value of the amount of exposure, gain for video signal is corrected. In the motion picture mode, the diaphragm and the electronic shutter speed is adjusted for preventing flicker from making appearance under illumination of a fluorescent lamp in indoor photographing. The adjusted speed can be $\frac{1}{100}$ sec.

30 Claims, 25 Drawing Sheets

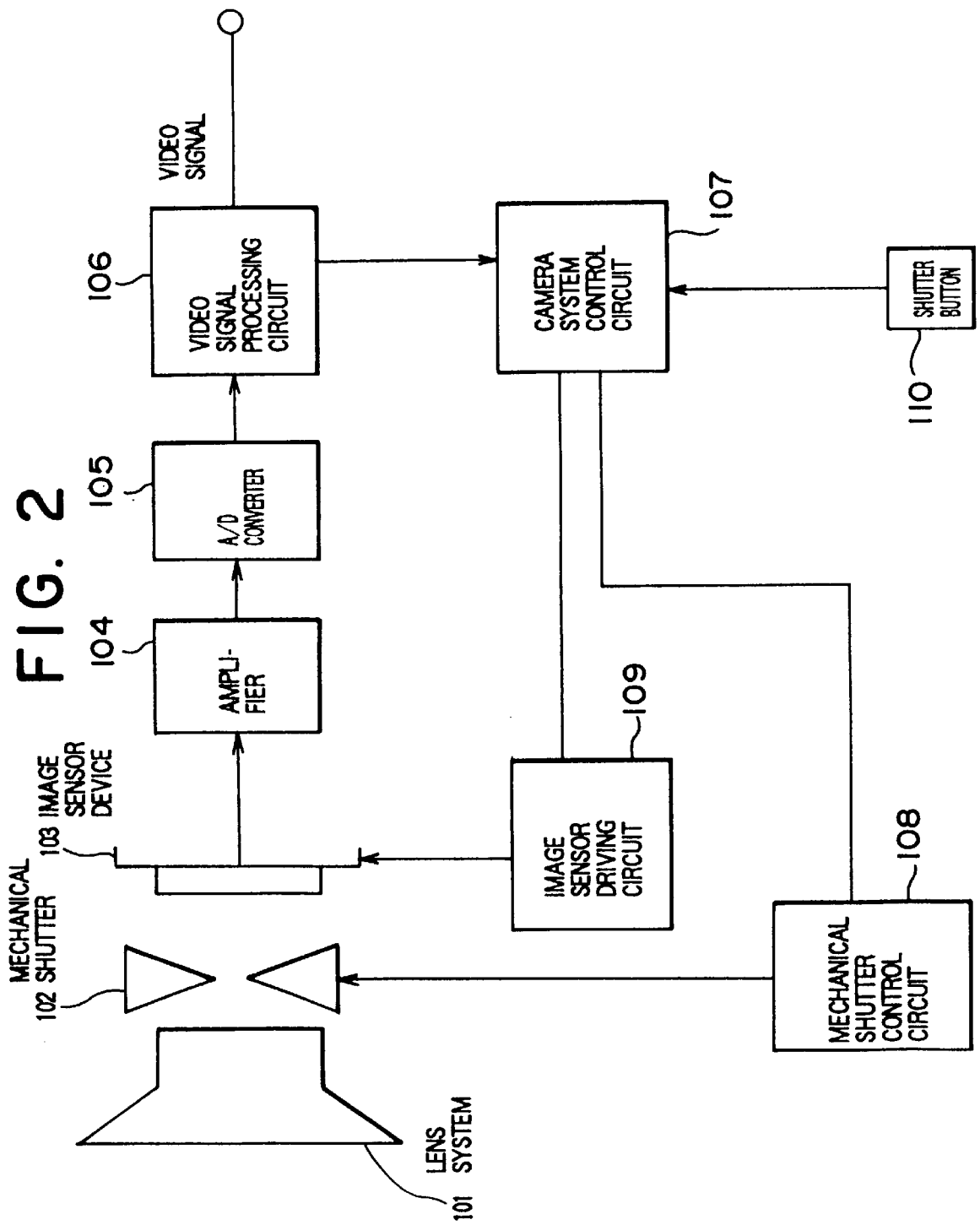

123 HORIZONTAL CCD
121 PHOTODIODE
122 VERTIAL CCD gr : GREEN COLOR FILTER　　mg : MAGENTA COLOR FILTER
cy : CYAN COLOR FILTER　　ye : YELLOW COLOR FILTER
V1 : VERTICAL TRANSFER PULSE1　　V2 : VERTICAL TRANSFER PULSE2
V3 : VERTICAL TRANSFER PULSE3　　V4 : VERTICAL TRANSFER PULSE4

IMAGE PICKUP APPARATUS AND METHOD OF CONTROLLING THE SAME

CROSS REFERENCE TO RELATED APPLICATION

This is a continuation of U.S. application Ser. No. 08/418,441, filed Apr. 7, 1995, now U.S. Pat. No. 5,847,756 the subject matter of which is incorporated by reference herein.

BACKGROUND OF THE INVENTION

The present invention relates to an image pickup apparatus (also referred to as the imaging apparatus) and a method of controlling the same.

In accompanying remarkable progress in the digital signal processing techniques, there have been developed and realized numerous and various functions in the field of the image pickup apparatus typified by a video camera. Further, the image pickup apparatus such as video camera is now attracting attention as a picture or image input apparatus for a computer or the like image processing system because of capability for easily making available digital video signals. Data of the picture or image handled by the computer or the like system is in general those of still pictures. Accordingly, in order to obtain a video signal for a still picture, it is generally practiced to extract a video signal of a given one field or frame a motion picture signal outputted from a camera-integrated type video tape recorder for domestic use, wherein the extracted video signal is stored once in a memory or storage device. The video signal recorded in the memory or the like storage medium is then inputted to the computer as still picture data. In this conjunction, a technique for generating a still picture with correct exposure with a video camera is disclosed in JP-A-2-288679 (Japanese Unexamined Patent Application Publication No. 288679/1990).

However, in the conventional image pickup apparatus or video camera, the image sensor device (also referred to as the imager or charge coupled device, i.e., CCD in abbreviation) allows the signal charges to be read out only once from the pixels (picture elements) of the image sensor device constituted by photodiodes with color filters. In other words, only the so-called destructive read-out operation is permissible. Besides, it is required to read out mixedly the signals simultaneously from two pixels located adjacent to each other in the vertical direction (this read-out scheme is referred to as the two line mixed read-out scheme). With such read-out scheme, however, it is impossible to generate a still picture having a resolution comparable to the number of pixels arrayed in the image sensor device.

As another hitherto known image pickup apparatus capable of generating both a still picture and a motion picture, there may be mentioned an image pickup apparatus disclosed, for example, in JP-A-59-194575 (Japanese Unexamined Patent Application Publication No. 194575/1984), in which the still picture pickup operation is performed by opening and closing an iris diaphragm.

However, most of the iris diaphragms employed in an imaging devices or the video cameras destined for domestic use is implemented in a simple structure incorporating a meter-type diaphragm blade driving mechanism in which a coil employed usually in meters such as DC meters and a permanent magnet are so combined that repulsion/attraction produced between a magnetic field generated by a current flowing through the coil and the permanent magnet are utilized for setting a specific iris value through cooperation of resiliency imparted to the blades constituting the diaphragm.

The diaphragm device of the structure mentioned above is not inherently designed for use in the application where a high-speed operation thereof is required. However, in order to operate the diaphragm of this type at a high speed, it becomes necessary to additionally provide a high-speed servo-loop with a view to increasing the response performance.

Thus, with the meter-type diaphragm device of the structure mentioned above, difficulty will be encountered in operating the diaphragm at a high speed which is required for generating a still picture (i.e., for realizing a still picture pickup mode) with satisfactory picture quality as described in the above publication. Such being the circumstances, in the still picture pickup operation, it is practiced in most cases to provide a mechanical shutter capable of performing open/close operation at a high speed in addition to the meter-type diaphragm device.

SUMMARY OF THE INVENTION

When the image pickup apparatus capable of generating not only a motion picture but also a still picture is to be implemented inexpensively in a small size at low cost, as attempted in the video camera mentioned above, a mechanism required for the exposure control has to be realized in a structure simplified as far as possible. To this end, it is conceivable to adopt the meter-type diaphragm structure mentioned above. However, with such diaphragm device, it is difficult or even impossible to realize a high response in setting the desired iris value. Additionally, because the charge sweep-out operation can be performed only at the interval corresponding to the field period, attempt for realizing a high-speed still picture pickup operation will be accompanied with not a few problems such as mentioned below.

(1) When a still picture is to be taken, starting from the iris value used in the motion picture mode or an iris value set by further closing the diaphragm from the position used in the motion picture mode, there will be required the exposure for a longer period than that corresponding to the shutter speed (i.e., time corresponding to one field) used in the motion picture imaging operation, in order to realize correct exposure for the still picture taking operation.

(2) In order to shorten the exposure time in the still picture mode, it is necessary to ensure a proper dose or amount of exposure by enlarging the aperture of the diaphragm when compared with that used in the motion picture mode. To this end, operation for opening further the diaphragm or iris is started in response to inputting of a signal commanding the start of still picture pickup operation (hereinafter referred to as the still picture taking command). In that case, when the iris is shifted in the opening direction and when the motion picture video signal is being outputted, the exposure will become excessive (over-exposure), whereby the motion picture is generated with the over-exposure, to a disadvantage.

(3) In the case of the known diaphragm device, it has been presumed that the diaphragm is shifted to the set value rapidly and accurately. In actuality, however, it is required to provide additionally a servo-loop or the like for realizing such diaphragm device while assuring the exposure with high accuracy.

For a better understanding of the present invention, the above problems will be discussed below in more detail by referring to FIGS. 1A and 1B of the accompanying drawings. FIG. 1A illustrates graphically an exposure control in the still picture pickup mode which is effected without updating the iris value in the motion picture imaging mode. In the figure, aperture area S of an iris diaphragm is taken along the ordinate with the time being taken along the abscissa. Further, reference characters a1 to a4 are used for identifying the fields, respectively, while areas indicated by Va1 to Va3 indicate amounts (doses) of exposure in the above-mentioned fields, respectively. Furthermore, reference character ta1 represents a time corresponding to one field, and ta2 represents an exposure time in the still picture mode. For simplification of discussion, it is assumed that the aperture area (aperture size) S decreases linearly until the iris diaphragm is closed.

Referring to FIG. 1A, it is assumed that the still picture command is issued in the field a2. On the assumption, the exposure control is so performed that the amount of exposure Va1 for the field a1 or a2 in the motion picture mode becomes equal to a sum of the exposures Va2 and Va3 in the still picture mode. Thus, there is required the exposure time not shorter than one field. If the exposure time ta2 is to be shortened, the signal amplification factor has to be increased in order to compensate for decrease in the amount of exposure brought about by the shortened exposure time.

FIG. 1B shows an exposure time in which the iris diaphragm is shifted toward the opened state in response to a command for changing over the motion picture imaging operation to the still picture pickup operation (hereinafter referred to as the still picture pickup preparation command) in order to shorten the exposure time in the still picture mode, whereupon the still picture pickup operation is executed. Parenthetically, in FIG. 1B, like symbols as those used in FIG. 1A have same meanings as mentioned above. In addition, symbols b1 to b5 are used for identifying the individual fields, respectively. The areas indicated by Vb1 to Vb4, respectively, represent doses or amounts of exposure in the associated fields.

In FIG. 1B, the fields b1 and b2 correspond to a motion picture imaging period, while the fields b3 and b4 correspond to a period for making preparation for the still picture pickup operation. In the field b5, the still picture is picked up by closing the iris diaphragm. Assuming now that the still picture pickup preparation command is issued in the field b2, the iris diaphragm is further opened in the fields b3 and b4 corresponding to the still picture pickup preparation period in order to shorten the exposure time in the still picture mode. Thereafter, the iris diaphragm is closed in response to the still picture taking command issued in the field b4. Through this procedure, the amount of exposure Vb1 can be made to coincide with the amount of exposure Vb4 notwithstanding of the short exposure time.

However, in the fields b3 and b4, the over-exposure state prevails. Consequently, such processing as masking the output signal will become necessary.

On the other hand, in the field b5, error will be incurred in the exposure because of variance in the closing behavior of the diaphragm from one to another operation even though it is presumed that the diaphragm is closed linearly with high repetition accuracy.

In the light of the state of the art described above, it is a general object of the present invention to provide an image pickup apparatus which can compatibly ensure both the motion picture imaging operation and the still picture pickup operation with an exposure system of a simplified structure.

In view of the above and other objects which will become apparent as the description proceeds, it is proposed according to an aspect of the present invention that in a still picture mode, the exposure control is performed by previously shortening the exposure time for the image sensor device by making use of the electronic shutter function thereof already in the motion picture imaging mode while maintaining a diaphragm at a position closer to the opened state.

According to another aspect of the invention, it is taught that when the diaphragm is once moved in the opening direction in the still picture mode, the electronic shutter speed is updated in accompanying the shift of the diaphragm so that a correct amount of exposure can be ensured regardless of change in the iris value.

Further, according to yet another aspect of the invention, the electric charges are swept out after the start of the diaphragm closing operation to thereby allow the still picture pickup to be effected with a short exposure time.

Furthermore, according to the fourth aspect of the invention, it is taught that the state of the diaphragm is detected in the course of diaphragm closing operation for correcting the signal delivered from the image sensor device with a parameter indicating the detected state of the diaphragm so that error brought about mechanically by the diaphragm can be cancelled out.

Thus, according to the first mentioned aspect of the present invention, the diaphragm is maintained at a position at which the diaphragm is opened somewhat in excess and the exposure control is performed by the electronic shutter in the motion picture mode. When the still picture taking command is issued, the diaphragm is closed while updating the electronic shutter speed correspondingly. Thus, even when the response of the diaphragm is accompanied with more or less time lag, there can be realized a short exposure time. Thus, generated a still picture picked up with a high shutter speed.

Additionally, even when error takes place in the exposure due to some factor intervening in driving the diaphragm, a still picture can be reconstructed with correct exposure because the error mentioned above is detected and compensated for through a correcting processing, which can ensure improved photographing by using the shutter.

When the diaphragm is once shifted in the opening direction in response to the still picture taking command, variation in the amount of exposure (exposure dose) due to change in the aperture can be suppressed by correspondingly updating the electronic shutter speed. Thus, the motion picture generated in precedence to the still picture pickup operation can be protected against any appreciable disturbance, whereby change-over from the motion picture mode to the still picture mode can be accomplished very smoothly.

It is another object of the present invention to provide an image pickup apparatus which is capable of generating a still picture with high resolution comparable to the number of pixels (i.e., pixel density) of an image sensor device incorporated in the apparatus even in the still picture mode.

To achieve the above object, it is taught according to an aspect of the present invention that the electric charges, i.e., signals, are outputted or transferred from the individual pixels (picture elements) of the image sensor device independent of one another in the still picture mode. On the other hand, in the motion picture mode, electric charges from every paired pixels located adjacent to each other in the vertical direction are mixedly read out on a field-by-field basis. Consequently, the output level of the image sensor device in the still picture mode becomes lower than that in the motion picture mode. Thus, when the output signals read out from the image sensor device in the still picture mode are processed similarly to the video signals generated in the motion picture mode, there may arise a problem with regards to the S/N ratio and others. In other words, the level of the output signal in the still picture mode needs to be increased.

Thus, the present invention also teaches that a total amount of electric charges stored or accumulated in the image sensor device in the still picture mode is increased more than that of the electric charges accumulated on a field-by-field basis in the motion picture mode. It is preferred that the total amount of the electric charges accumulated in the still picture mode should be 1.5 to 3.0 times as large as that in the motion picture mode. Unless the above-mentioned ratio is greater than 1.5, there may arise the problem that the S/N ratio is degraded because of insufficient output level in the still picture mode. On the other hand, when the ratio of concern exceeds 3.0, it will be required to lengthen the exposure time, which is of course undesirable. Most preferably, the output level of the image sensor device in the still picture mode should be made substantially equal to that in the motion picture mode. This can be accomplished by making the total amount of electric charges accumulated in the image sensor device in the still picture mode approximately twice as large as the amount of electric charges accumulated in every field in the motion picture mode.

Parenthetically, it should be mentioned that the amount of electric charges as stored or accumulated in the image sensor device is in proportion to the dose or amount of exposure which the device receives.

With the invention, it is also contemplated to provide a method of controlling the image pickup apparatus described above for achieving the objects or realizing the features of the invention described above.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a schematic block diagram showing generally a structure of an image pickup apparatus according to a first embodiment of the present invention;

DESCRIPTION OF THE PREFERRED EMBODIMENTS

Figure 1A:
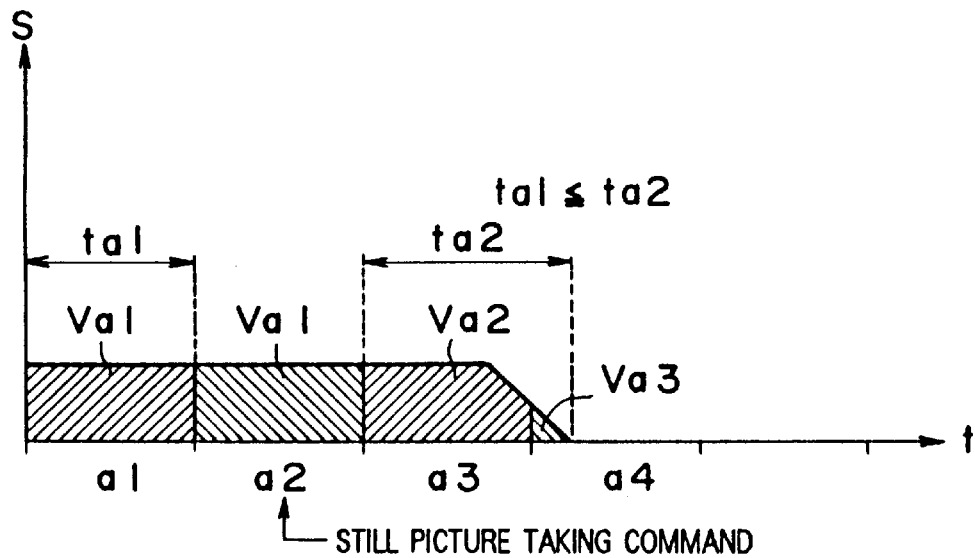
FIGS. 1A and 1B are diaphragms for graphically illustrating exposure controls in a motion picture mode and a still picture mode of an image pickup apparatus for having a better understanding of the concept of underlying the present invention.

Now, the present invention will be described in detail in conjunction with what is presently considered as preferred or typical embodiments thereof by reference to the drawing. In the following description, like reference characters designate like or corresponding parts throughout the several views.

Embodiment 1

Figure 3:
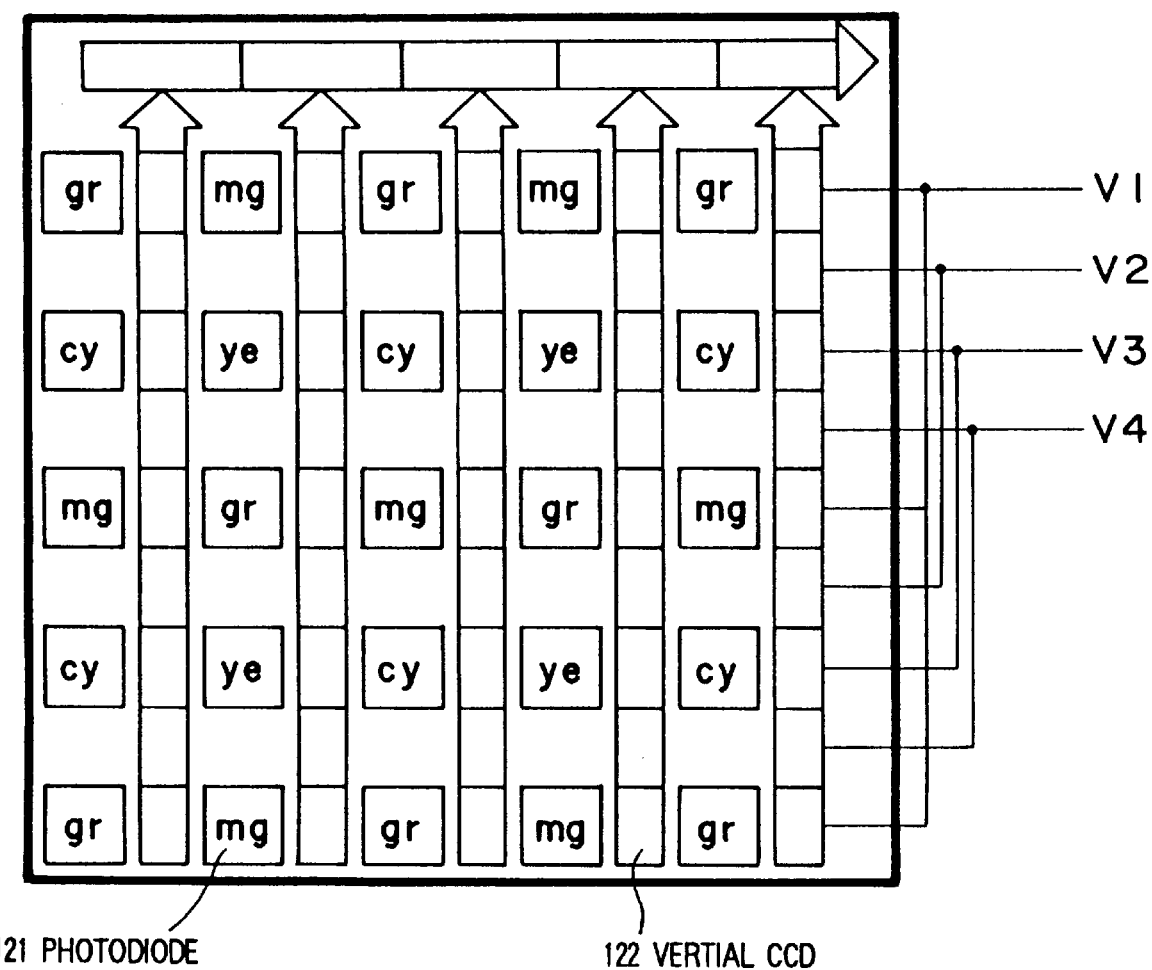
FIG. 3 is a view showing an exemplary or typical structure of an image sensor device according to an embodiment of the invention.

FIG. 2 is a schematic diagram showing generally a structure of an image pickup apparatus (which also may be referred to as the imaging apparatus) according to a first embodiment of the present invention. As can be seen in the figure, the image pickup apparatus is comprised of a lens system 101, a mechanical shutter 102, an image sensor device or an imager 103 which is preferably of a CCD type, an amplifier 104, an analogue-to-digital (A/D) converter 105, a video signal processing circuit 106, a camera system control circuit 107, a mechanical shutter control circuit 108, an image sensor driving circuit 109 and a shutter button 110. FIG. 3 is a view showing an exemplary or typical structure of the image sensor device 103. In the figure, reference numeral 121 denotes photodiodes, 122 denotes vertical charge coupled devices (hereinafter referred to as the vertical CCD in abbreviation), and 123 denotes a horizontal charge-coupled device (hereinafter referred to as the horizontal CCD in abbreviation), wherein there are disposed on the surfaces of the various photodiodes 121 green color separation filters gr, magenta color separation filters mg, cyan color separation filters cy and yellow color separation filters ye, respectively. The photodiodes equipped with these color separation filters, respectively, are also conventionally referred to as the picture elements or pixels.

In operation, light lays or beams picked up through the lens system 101 impinge onto the image sensor device 103 by way of the mechanical shutter 102 whose iris value (which may also be referred to as the aperture value or F-number) F is controlled by the mechanical shutter control circuit 108. In the image sensor device 103, the incident light undergoes photoelectric conversion by the photodiodes 121 disposed in an array on the surface of the image sensor 103, wherein the electric signals resulting from the photoelectric conversion are mixed on a pixel-by-pixel basis by the vertical CCDs 122 to be ultimately outputted through the horizontal CCD 123. The output signal of the image sensor device 103 is amplified by the amplifier 104, the output signal of which is then converted into a digital signal through the A/D converter 105 to be subsequently inputted to the video signal processing circuit 106. In the video signal processing circuit 106, the input signal is converted into a video signal such as the NTSC signal. Further, the video signal processing circuit 106 serves to derive from the digital signal the luminance information of an object whose picture is taken by the image pickup apparatus. The luminance information is then outputted to the camera system control circuit 107. The camera system control circuit 107 then controls the mechanical shutter control circuit 108 on the basis of the luminance information to thereby change the iris value (aperture) of the mechanical shutter 102 such that the output signal of the video signal processing circuit 106 has a desired luminance level. Besides, the camera system control circuit 107 serves to control the image sensor driving circuit 109, as occasion requires, to thereby control a shutter speed of an electronic shutter of which function is incorporated in the image sensor device 103.

Figure 4:
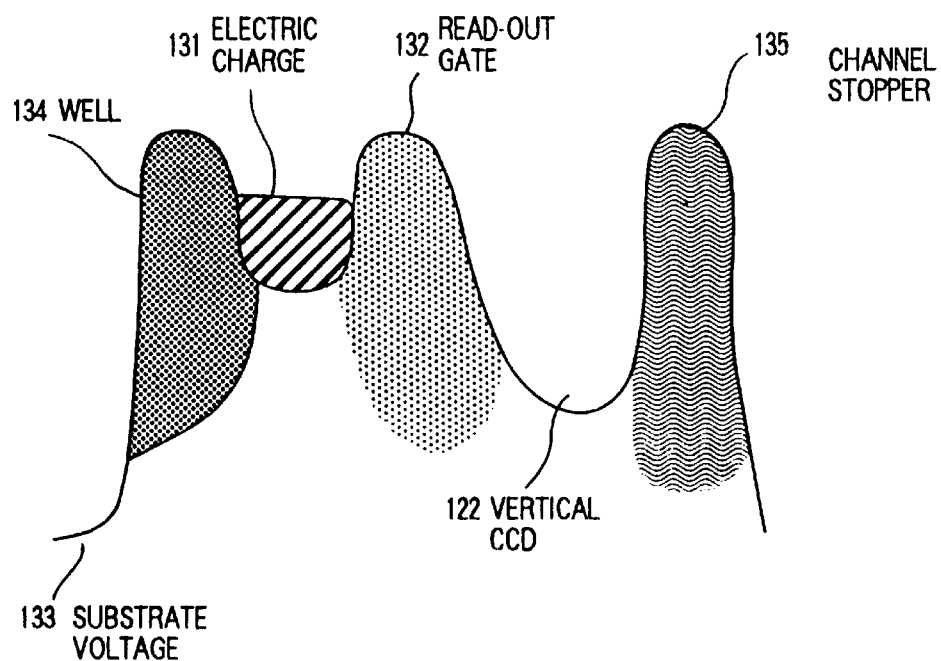
FIG. 4 is a diagram for illustrating schematically potential distribution in an image sensor device according to an embodiment of the invention.
Figure 5:
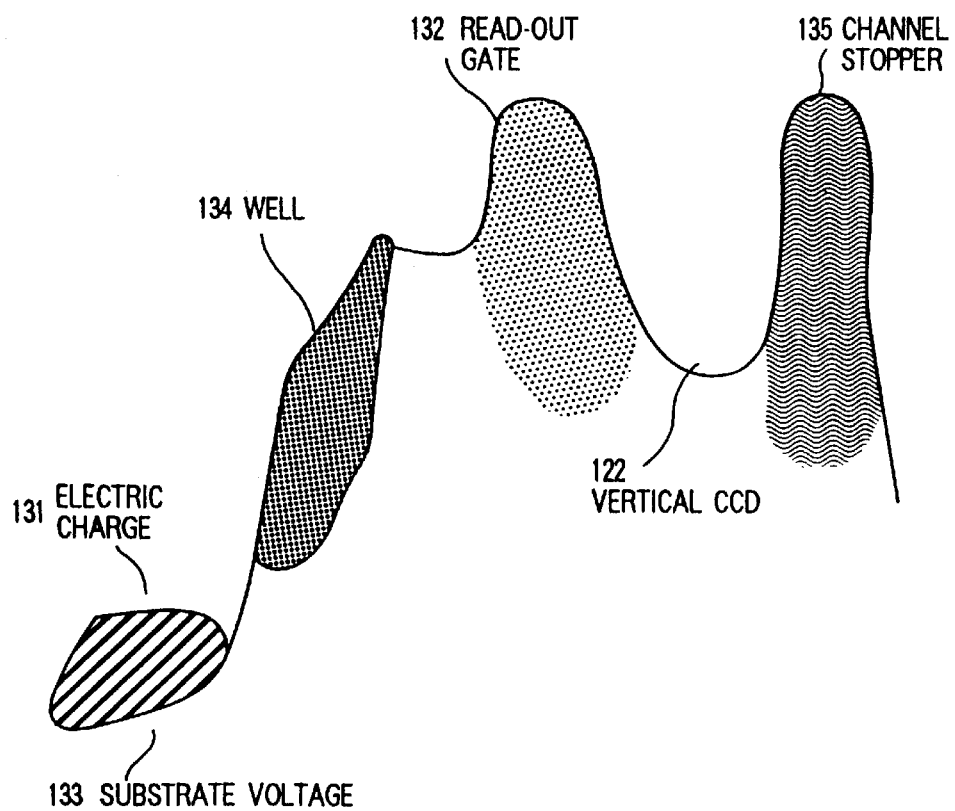
FIG. 5 is a view similar to FIG. 4 and shows potential distribution in the image sensor device in another operation phase thereof.

Next, the electronic shutter will be described in brief. FIG. 4 is a diagram for illustrating schematically potential distribution in the image sensor device 103. In this figure, a reference numeral 131 designates electric charge stored or accumulated in the image sensor device 103, a numeral 132 denotes an information read-out gate, 133 designates a substrate voltage, 134 denotes a well, and a reference numeral 135 denotes a channel stopper. The charge generated as a result of the photoelectric conversion performed by the photodiode 121 is accumulated between the read-out gate 132 and the well 134 in such a manner as illustrated in FIG. 4. Upon application of a charge sweep-out pulse signal from the image sensor driving circuit 109 to the image sensor device 103, the potential level of the substrate voltage 133 is lowered, which results in lowering of the potential in the well 134 under the influence of the lowering of the substrate voltage 133, as can be seen in FIG. 4. As a consequence, the electric charge 131 is swept out as a part of the substrate voltage 133. At that time, the channel stopper 135 functions to prevent leakage of the electric charge from the vertical CCD 122 corresponding to the adjacent pixel.

With the structure described above, when the shutter button 110 is depressed, a shutter close control signal is inputted to the mechanical shutter control circuit 108 from the camera system control circuit 107, whereby the mechanical shutter 102 is caused to close after lapse of a predetermined time by means of the mechanical shutter control circuit 108. The light rays inputted to the image sensor device 103 before the mechanical shutter 102 is closed undergo the photoelectric conversion by the photodiodes 121 arrayed in the image sensor device 103 through the operation described previously, wherein the signals resulting from the photoelectric conversion are transferred to the horizontal CCD 123 by way of the vertical CCDs 122 during a period in which the mechanical shutter 102 is closed and converted into voltage signals to be outputted in synchronism with horizontal scanning pulses supplied from the image sensor driving circuit 109. In this conjunction, it should be mentioned that the image sensor device 103 is so implemented that the read-out operation is effected in a destructive manner, so to say. Thus, once the signals are read out from the photodiodes 121, no signal remain in the photodiodes 121. For this reason, when the two line mixed read-out scheme which is generally known as the conventional read-out method is adopted, information of the frame will be lost.

At this juncture, the two line mixed read-out scheme will be explained. In the image sensor device 103, the signals from two pixels located adjacent to each other in the vertical direction are mixedly read out in the manner disclosed in JP-A-63-114487 (Japanese Unexamined Patent Application Publication No. 114487/1988) before the shutter button 110 is depressed. This is the so-called two line mixed read-out scheme.

Figure 6:
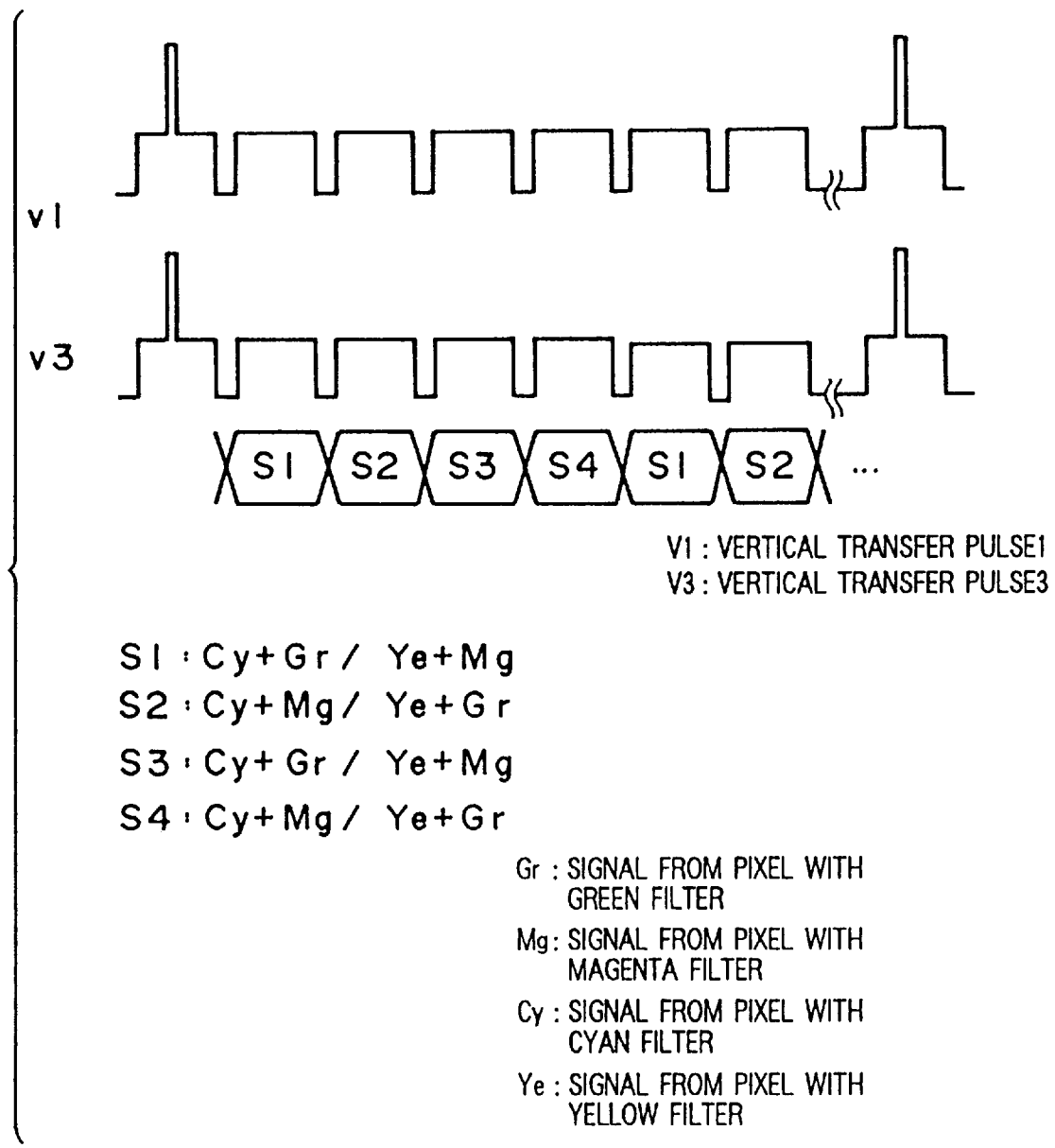
FIG. 6 is a timing chart for illustrating a two-line mixed read-out scheme for reading out signal charges from an image sensor device according to an embodiment of the invention.

FIG. 6 is a timing chart for illustrating a relation between the vertical transfer pulse signal and the transfer of signal charges in the vertical CCD 122 according to the two line mixed read-out scheme. Referring to the figure, when the ternary pulse signal 1 (v1) for the vertical transfer assumes a high level, the signal charges are transferred to the vertical CCD 122 from the photodiodes 121 arrayed in the lines equipped with the green color separation filters gr and the magenta color separation filters mg, while when a ternary pulse signal 3 (v3) for the vertical charge transfer assumes a high level, the signal charges are transferred to the vertical CCD 122 from the photo-diodes 121 of the lines equipped with the cyan color separation filters cy and the yellow color separation filters ye, respectively. The signal charges transferred to the vertical CCDs 122 in such manner as illustrated in FIG. 6 are then transferred to the horizontal CCD 123 and outputted from the image sensor device 103.

Figure 7:
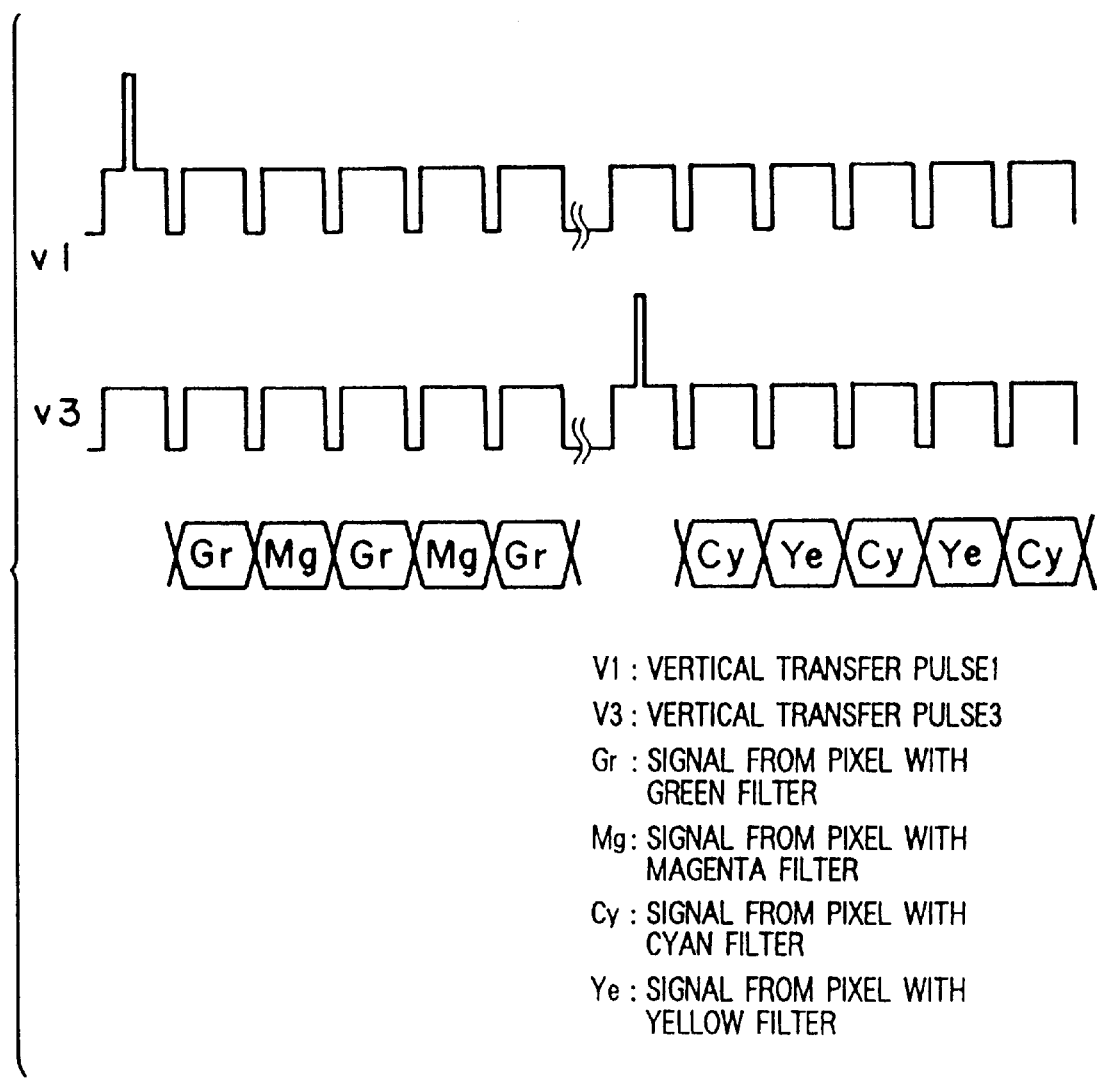
FIG. 7 is a timing chart for illustrating a one line read-out scheme for reading out electric charges from an image sensor device according to another embodiment of the invention.

However, when the two line mixed read-out operation mentioned above is performed in the still picture pickup mode, it is impossible to obtain the resolution comparable to the number of pixels disposed in the vertical direction of the image sensor device 103. Accordingly, in the still picture pickup mode, a one line read-out operation is performed, which will be described below. FIG. 7 is a timing chart for illustrating a timing relation between the vertical transfer pulse signals and the transfer of the signal charges in the vertical CCD 122 according to the one line read-out scheme. As can be seen in the figure, the periods in which the ternary pulses of the vertical transfer pulse signals 1 and 3 assume a high level take place alternately every other field. Consequently, in the field for which the ternary pulse of the vertical transfer pulse signal 1 is at high level, the signal charges from only the photodiodes arrayed in the lines qr and mg are transferred to the vertical CCDs 122, while in the succeeding field, the signal charges only from the photodiodes arrayed in the lines cy and ye are transferred to the vertical CCDs 122. Since the signal charges transferred to the vertical CCDs 122 are all transferred to the horizontal CCD 123 during a period corresponding to one field, there arises no possibility that the signal charges of the adjacent photodiodes 121 are mixed together, differing from the two line mixed read-out scheme. In other words, one signal can be obtained for one photodiode or pixel.

The signal charges transferred to the horizontal CCD 123 are outputted from the image sensor device 103 in synchronism with the horizontal scanning pulse signal supplied from the image sensor driving circuit 109. The output signal of the image sensor device 103 is amplified by the amplifier 104, converted to a digital signal by the A/D converter 105 and inputted to the video signal processing circuit 106 which converts the input signal to the video signal to be outputted from the image pickup apparatus. However, for carrying out the one line read-out method mentioned above, it is required to maintain the mechanical shutter 102 in the fully closed state at least during a period extending from a time point at which the exposure for picking up the still picture was started to a time point at which the signals mentioned above are completely read out, in order to make the amount of exposure (which may be referred to as the exposure dose) which the photodiodes in the lines gr and mg receive be equal to the amount of exposure which the photodiodes in the lines cy and ye receive. In this conjunction, the amount of exposure which the image sensor device 103 receives represents a quantity of light impinged onto the image sensor device 103 during a period from a time point immediately after transfer of the signal charge to the vertical CCD 122 from the photodiodes 121 in the preceding field to the time point at which the mechanical shutter 102 is fully closed.

Figure 8:
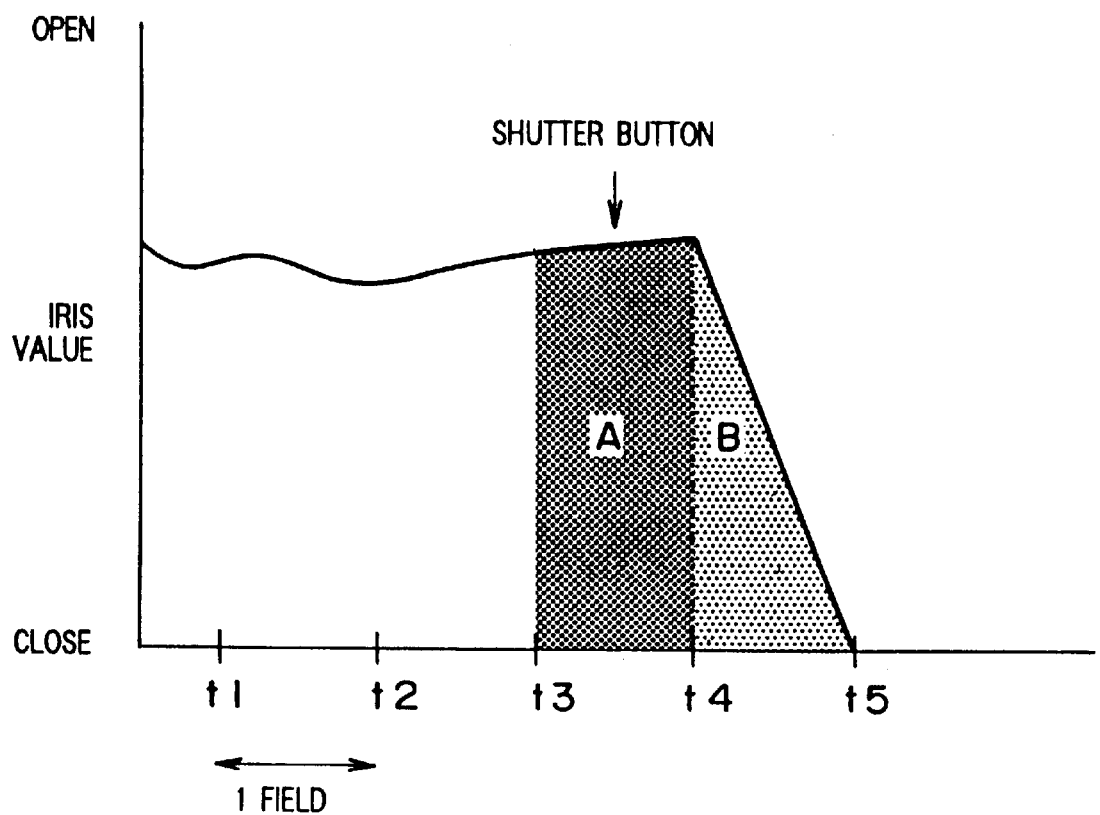
FIG. 8 is a view for graphically illustrating exposure which an image sensor device according to an embodiment of the invention undergoes.

FIG. 8 is a view for graphically illustrating a relation between the iris values of the mechanical shutter 102 and the amount of exposure which the image sensor device 103 receives. In the exposure control of the image pickup apparatus implemented in the form of a video camera according to the instant embodiment of the invention, the image pickup apparatus operates in a similar manner as the conventional video camera until the shutter button 110 is pushed. More specifically, electric charges accumulated in the image sensor device 103 during a period corresponding to one field are read out on a field-by-field basis, wherein the amount of exposure is arithmetically determined on the basis of the luminance signal derived by the signal processing circuit 106 to thereby control the iris of the mechanical shutter 102 by means of the mechanical shutter control circuit 108 so that a predetermined amount of exposure can be attained. Unless the electronic shutter is used, the exposure of the image sensor device 103 is started from the time points $t_1$, $t_2$, $t_3$ and $t_4$, respectively, at which the charges are transferred from the photodiodes 121 to the vertical CCDs 122. Accordingly, when the shutter button 110 is pushed during a period from the time point $t_3$ to the time point $t_4$, exposure for generating a still picture will be started from the time point $t_4$. In this case, it is assumed that an area indicated by A (amount of exposure) in FIG. 8 represents a proper amount of exposure for an object whose picture is currently being taken. On the assumption, in order to ensure a correct or proper amount of exposure in the still picture imaging mode, it is required to operate the mechanical shutter 102 such that an area B shown in FIG. 8 and indicating the amount of exposure during a period from the time point $t_4$ to a time point $t_5$ becomes greater than the area A.

In the image pickup apparatus according to the first embodiment of the invention shown in FIG. 2, it is noted that noise components contained in the signals generated in the motion picture imaging mode differ in respect to phase from one to another field. However, since the signals containing the noise components are smoothed by the visual sensation of viewers (human being), the noise components contained in the motion picture signal will not provide any appreciable eye-scores to the viewers. By contrast, in the case of the still picture, the smoothing by the visual sensation of the viewers can not be expected to be effective. Under the circumstances, in the still picture pickup mode, it is required to improve positively the S/N ratio when compared with the conventional image pickup apparatus or video camera designed for taking the motion picture.

Thus, there is provided a method of improving the S/N ratio according to an aspect of the present invention. This method will be explained below by reference to FIG. 4. Electric charge obtained through photoelectric conversion by the photodiode 121 is stored between the read-out gate 132 and the well 134. In the motion picture read-out mode, the potential at the read-out gate 132 is lowered once during every field when the ternary pulses of the vertical transfer pulse signals 1 and 3 assume a high level, whereby the electric charge 131 is transferred to the vertical CCD 122. In this conjunction, it is assumed that when the potential at the read-out gate 132 is lowered as mentioned above, the potential at the read-out gate of the pixel located vertically adjacent to the pixel having the aforementioned read-out gate is lowered when the ternary pulse of the vertical transfer pulse signal 3 becomes high. Then, the electric charge 131 detected by the method mentioned above will be mixed with the charge resulting from the photoelectric conversion performed by the adjacent photodiode located above or below in the vertical CCD 122.

In the still picture pickup mode, the ternary pulse only of the vertical transfer pulse signal 1 is set to high level in the first field where the read-out operation is started while the ternary pulse only of the vertical transfer pulse signal 3 is set to high level in the second field, whereby the electric charge 131 can be read out without being mixed. In that case, so far as the electric charge 131 does not overflow from between the read-out gate 132 and the well 134, the vertical CCDs 122 and the horizontal CCD 123 are capable of transferring the electric charge even when a greater amount of the electric charge is charged for one pixel as compared with that in the motion picture imaging mode (e.g. even when 1.3 to 3 times and more preferably 2.0 times as large as the electric charge 131 is accumulated for one pixel when compared with the electric charge accumulated in the motion picture imaging mode). In this manner, a greater amount of electric charge can be stored in the image sensor device 103 in accordance with the method described above, whereby the S/N ratio can correspondingly be improved.

Embodiment 2

Next, an image pickup apparatus according to a second embodiment of the present invention will be described by reference to the drawings.

It should first be mentioned that the structure of the image pickup apparatus according to the second embodiment of the invention is substantially same as that of the first embodiment. Accordingly, so long as the structure of the image pickup apparatus is concerned, FIG. 2 will be referred to. Further, repeated description of those components of the image pickup apparatus which are common to the first embodiment will be omitted. Further, it should also be mentioned that in the case of the image pickup apparatus according to the second embodiment of the invention, it is preferred that the amount of exposure for the image sensor device 103 is increased to thereby increase the amount of electric charge as stored, in order to improve the S/N ratio. Accordingly, it is assumed that the exposure control is performed such that the amount of electric charge as accumulated in the image sensor device 103 in the still picture pickup mode is 1.5 times as large as that of the charge stored in the motion picture imaging mode.

Figure 9:
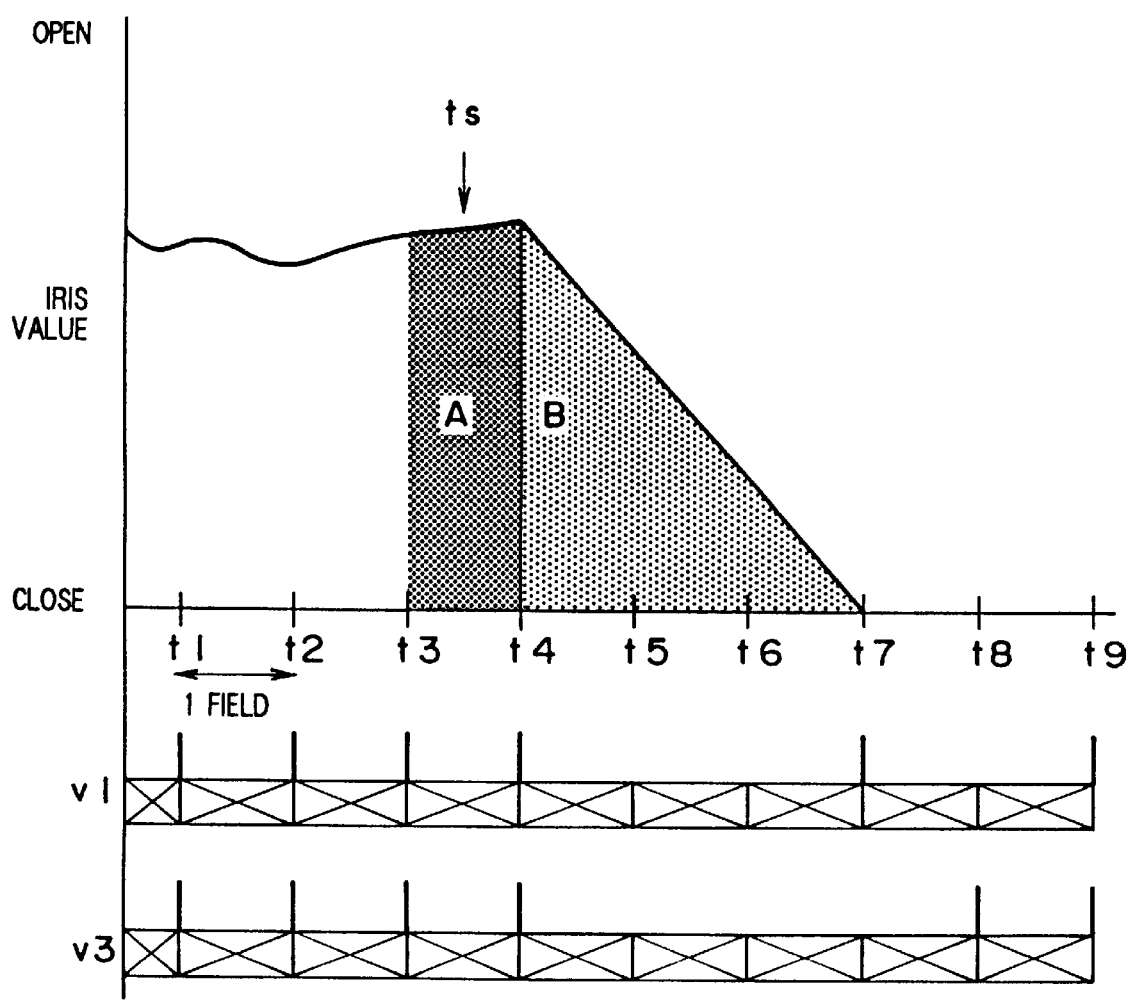
FIG. 9 is a view for graphically illustrating exposure to an image sensor device and a method of driving the same according to another embodiment of the invention.

FIG. 9 is a view for graphically illustrating a relation between the iris value of the mechanical shutter 102 and the amount of exposure which the image sensor device 103 receives in combination with a timing for transferring electric charges from the photodiodes 121 to the vertical CCD 122 in the image pickup apparatus according to the second embodiment of the invention. In the image pickup apparatus now under consideration, the exposure control is performed in a similar manner as in the case of the conventional video camera described hereinbefore in conjunction with the first embodiment before the still picture pickup mode is validated. In FIG. 9, only three fields for taking a motion picture is shown for simplification of illustration. It should however be understood that the length of the time taken for taking a motion picture is arbitrarily given by a time required for the exposure control to be stabilized and a time lapsing before the shutter button 110 is pushed. Assuming that the shutter button 110 is depressed at a time point $t_S$ shown in FIG. 9 after stabilization of the exposure control for the motion picture mentioned above, a shutter close control signal is inputted to the mechanical shutter control circuit 108 from the camera system control circuit 107, as a result of which the mechanical shutter 102 starts the closing operation from the time point $t_4$, i.e., at the beginning of the succeeding field, under the control of the mechanical shutter control circuit 108. In other words, the exposure for the still picture starts at the time point $t_4$. In this conjunction, it is assumed that the mechanical shutter 102 linearly changes the iris value at a constant rate without being accompanied with any appreciable inertia, and that the shutter is closed, starting from the current iris value, after lapse of a time corresponding to three fields.

As may be seen in FIG. 9, generation of the ternary pulses of the vertical transfer pulse signals 1 (v1) and 3 (v3) is stopped during a period extending from the time point $t_4$ to a time point at which the mechanical shutter 102 is closed, whereby operation for reading out the electric charge from the photodiodes 121 is suspended.

Thus, under the conditions mentioned above, the amount of exposure in the still picture pickup mode, i.e., the area B shown in FIG. 9, which is 1.5 times as large as the amount of exposure in the motion picture imaging mode, as represented by the area A shown in FIG. 9, can be obtained for the image sensor device 103, as in the case of the first embodiment of the invention. According to the method mentioned above, the light beams impinged onto the image sensor device 103 during the period between the time points $t_4$ and $t_7$ undergo the photoelectric conversion, and the electric charges thus stored in the image sensor device 103 are read out once at the timings $t_7$ and $t_8$, respectively, after the closure of the mechanical shutter 102 by setting high the ternary pulses of the vertical transfer pulse signals 1 (v1) and 3 (v3), respectively. In this manner, the one line read-out scheme is realized. At this juncture, it should however be mentioned that because of the operation based on the one line read-out scheme, the signal processing performed by the video signal processing circuit 106 is changed over to the still picture mode dedicated processing for converting the input signals to the video signals to be outputted.

Further, since the video signal generated during the period between the time points $t_4$ and $t_7$ can not be read out more than once, the video signal as read out should be stored once in a recording medium such as a memory so as to be outputted to a computer or the like image processing apparatus as the still picture data, as occasion requires.

Embodiment 3

An image pickup apparatus according to a third embodiment of the present invention will be described below.

It should first be mentioned that the structure of the image pickup apparatus according to the third embodiment of the invention is essentially same as that of the first and second embodiments. Accordingly, so long as the structure of the image pickup apparatus is concerned, FIG. 2 will be referred to. Further, repeated description of those parts common to the image pickup apparatuses according to the first and second embodiments will be omitted. In the case of the instant embodiment, description of the exposure control in the still picture pickup mode will be made on the assumption that the amount of electric charge accumulated in the image sensor device 103 in the still picture pickup mode is 1.5 times as large as that of the electric charge stored in the motion picture imaging mode.

Figure 10:
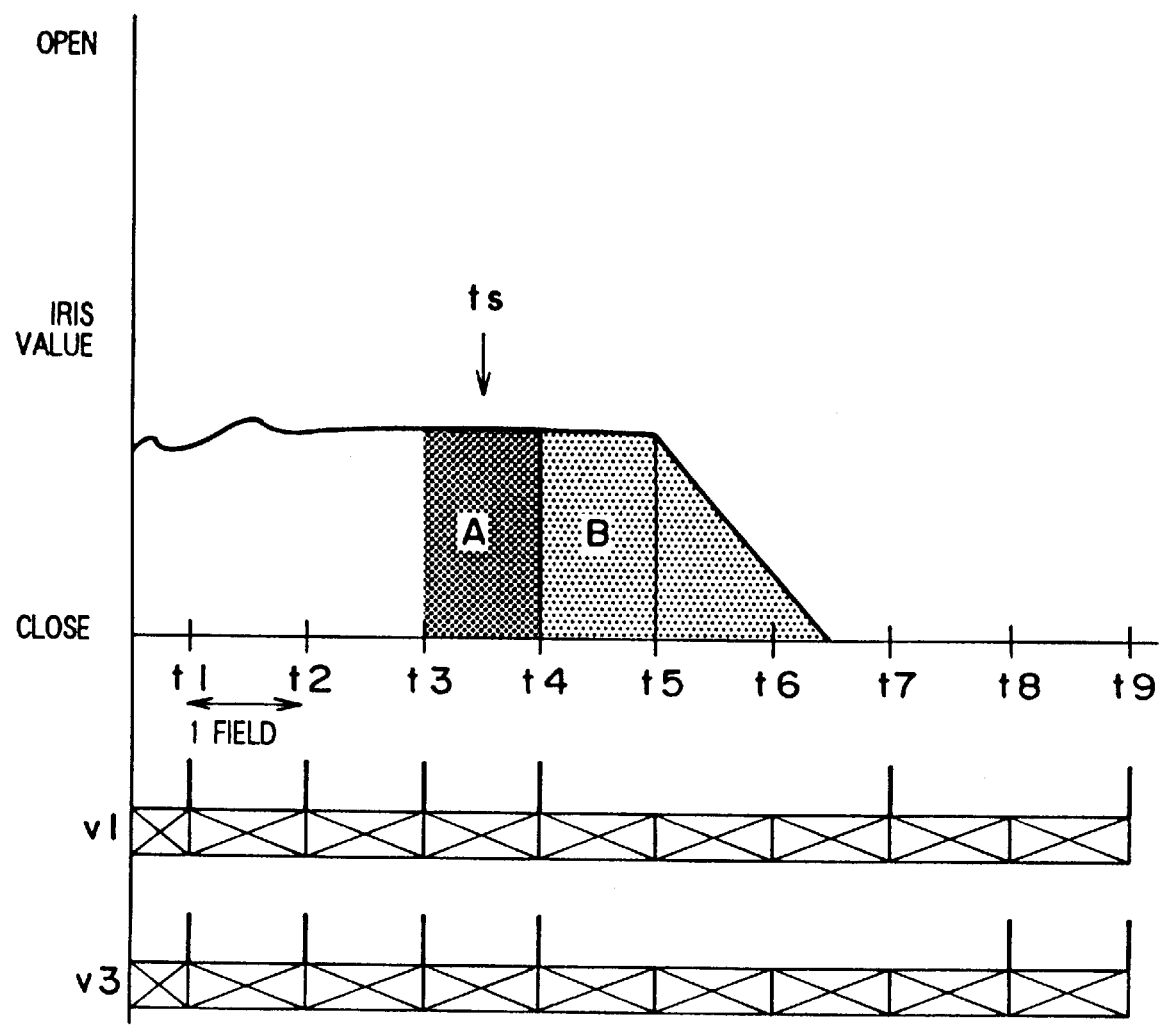
FIG. 10 is a view for graphically illustrating exposure to an image sensor device and a method of driving the same according to yet another embodiment of the invention.

FIG. 10 is a view for graphically illustrating a relation between the iris value of the mechanical shutter 102 and the amount of exposure which the image sensor device 103 receives in combination with a timing for transferring electric charges from the photodiodes 121 to the vertical CCD 122 in the image pickup apparatus according to the third embodiment of the invention. The instant embodiment differs from the second embodiment in that illuminance of the object whose picture is being taken is higher when compared with that of the object discussed above in conjunction with the second embodiment such that the exposure which the image sensor device 103 undergoes may be a half of that required in the image pickup apparatus according to the second embodiment.

In the image pickup apparatus now under consideration, the exposure control is performed as in the case of the conventional video camera before entering into the still picture pickup mode. When the shutter button 110 is pushed at a time point $t_3$ shown in FIG. 10 after stabilization of the motion picture imaging operation, exposure for the still picture pickup operation is started at a time point $t_4$. At this time point, the mechanical shutter 102 changes linearly the iris value at a constant rate without being accompanied with any appreciable inertia, as in the case of the second embodiment. More specifically, the time taken for the mechanical shutter 102 to close is a half of the time taken in the second embodiment. Namely, the shutter closing time corresponds to one and a half field in the case of the image pickup apparatus according to the instant embodiment. In this case, let's assume that the mechanical shutter 102 is closed, starting from the field which succeeds to the operation of the shutter button 110, i.e., from the time point $t_4$, as is in the case of the first embodiment. It is then impossible to realize the amount of exposure for the still picture pickup mode which is 1.5 times as large as that of the exposure in the motion picture imaging mode effectuated during the period between the time points $t_3$ and $t_4$. Under the circumstances, the camera system control circuit 107 is inhibited to output the shutter closing control signal for a predetermined time determined by a method described below even when the shutter button 110 is depressed.

Figure 11:
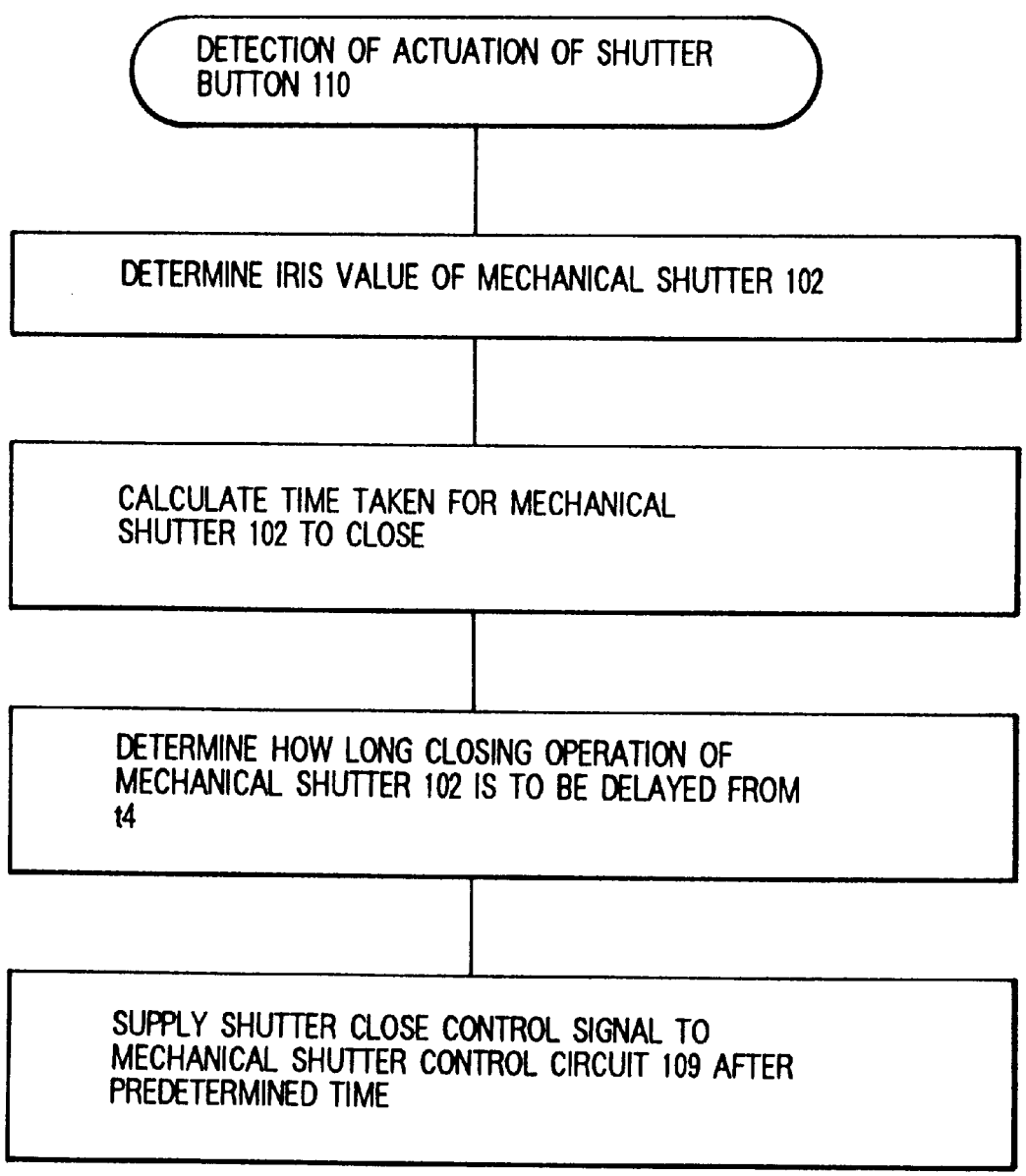
FIG. 11 is a flow chart for illustrating a series of operations involved in an exposure control processing in an image pickup apparatus according to a further embodiment of the invention.

FIG. 11 is a flow chart for illustrating a series of operations involved in the processing for outputting the shutter close control signal to the mechanical shutter control circuit 108 after lapse of the aforementioned predetermined time calculated by the camera system control circuit 107.

When the shutter button 110 is pushed, the shutter close control signal is inputted to the camera system control circuit 107, which responds thereto by determining the current iris value of the mechanical shutter 102 to thereby determine the time required for the mechanical shutter 102 to close, starting from the current iris value of the mechanical shutter 102. Subsequently, a time for delaying the shutter closing operation of the mechanical shutter 102 for the purpose of securing for the still picture pick-up the amount of exposure which is 1.5 times as large as that of the exposure in the motion picture imaging mode is arithmetically determined. The camera system control circuit 107 outputs the shutter closing control signal to the mechanical shutter control circuit 108 after lapse of the calculated time from the time point at which the shutter button 110 was pushed, to thereby cause the mechanical shutter 102 to be closed. At this juncture, it should be mentioned that the camera system control circuit 107 includes a detector for detecting the iris value of the mechanical shutter 102 and a circuit for arithmetically determining or calculating the aforementioned predetermined time required for ensuring for the image sensor device 103 the amount of exposure for the sill picture pick-up which is 1.5 times as large as that of the exposure in the motion picture imaging mode on the basis of the current iris value detected by the detector and the time taken for the mechanical shutter 102 to close, although the detector and the calculating circuit are omitted from illustration.

In the case of the image pickup apparatus according to the instant embodiment of the invention, the aforementioned predetermined time may be so set as to correspond to the duration of one field. Accordingly, the amount of exposure in the still picture pickup mode, as represented by the area B shown in FIG. 10, is 1.5 times as large as that of the exposure in the motion picture imaging mode, i.e., the area A shown in FIG. 10. In other words, the amount of exposure which is 1.5 times as large as that of the exposure made during the period from the time point $t_3$ to $t_4$ can be ensured for the image sensor device 103 in the still picture pickup mode. The light rays beams impinging on the image sensor device 103 during a period from the time point $t_4$ to the time point at which the mechanical shutter 102 is closed undergo the photoelectric conversion by the photodiodes of the image sensor device 103, wherein the resulting electric charges are read out from the image sensor device 103 as the video signal in accordance with the one line read-out method by setting high the ternary pulses of the vertical transfer pulse signals 1 and 3 once at the time points $t_7$ and $t_8$, respectively, after the closure of the mechanical shutter 102. However, because the read-out operation is performed in accordance with the one line read-out method, as mentioned above, the signal processing performed by the video signal processing circuit 106 is changed over to the processing dedicated to the still picture pick-up mode for converting the input signal to the video signal.

Further, since the video signal generated during the period between the time points $t_4$ and $t_7$ can not be read out more than once, the video signal as read out should be stored once in a storage medium such as a memory so as to be outputted to a computer or the like image processing apparatus as the still picture data, as occasion requires.

As can be seen from the foregoing description, in the case of the image pickup apparatus according to the third embodiment of the invention, it is possible to make available for the still picture pick-up the amount of exposure which is 1.5 times as large as that of the exposure in the motion picture imaging mode. Parenthetically, it goes without saying that when illuminance of the object being picked up is lower, which in turn means that the amount of exposure becomes correspondingly small, the predetermined time defined previously should correspondingly be elongated. Additionally, it should be noted that during the period from the time point $t_4$ to a time point at which the mechanical shutter 102 is closed, generation of the ternary pulses of the vertical transfer pulse signals 1 and 3 is stopped to thereby suspend the operation for reading out the signal charges from the photodiodes 121.

Embodiment 4

An image pickup apparatus according to a fourth embodiment of the present invention will described below.

Since the image pickup apparatus according to the instant embodiment of the invention includes some parts common to those of the image pickup apparatus according to the second embodiment, the following description will be directed to those respects in which the instant embodiment differs from the second embodiment on the assumption that the amount of electric charges stored in the image sensor device 103 in the still picture pickup mode is also 1.5 times as large as the amount of the electric charges stored in the motion picture imaging mode.

Figure 12:
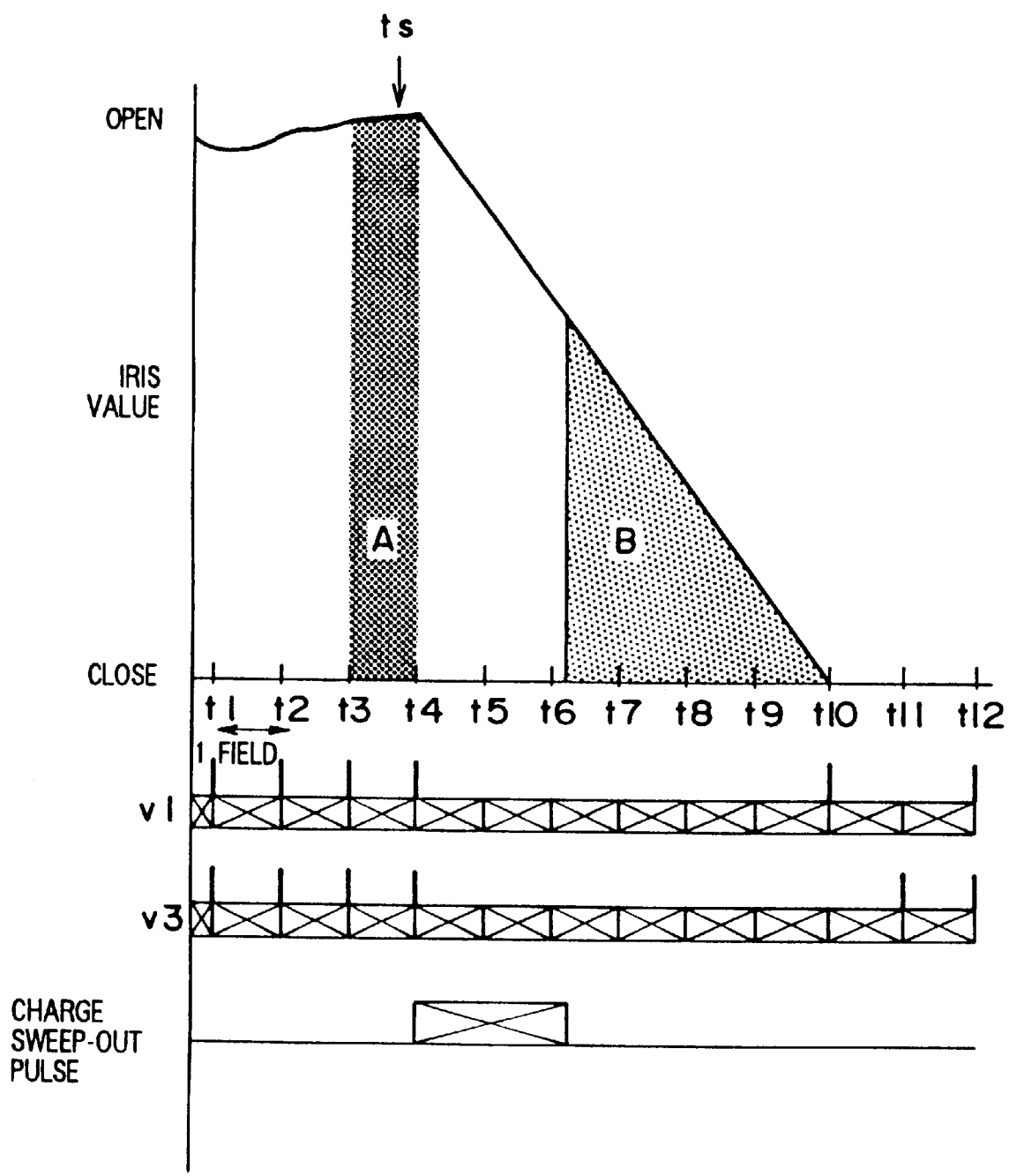
FIG. 12 is a view for graphically illustrating exposure to an image sensor device and a method of driving the same according to yet another embodiment of the invention.

FIG. 12 is a view for graphically illustrating a relation between the iris value of the mechanical shutter 102 and the amount of exposure which the image sensor device 103 receives together with a timing for transferring electric charges from the photodiodes 121 to the vertical CCD 122 and a timing of charge sweep-out pulses supplied from the image sensor device 103 in the image pickup apparatus according to the fourth embodiment of the invention. The instant embodiment differs from the second embodiment in that illuminance of the object is lower when compared with that of the object discussed above in conjunction with the second embodiment and that the exposure which the image sensor device 103 undergoes is twice as large as the exposure in the image pickup apparatus according to the second embodiment. In the image pickup apparatus now under consideration, the exposure control is performed as in the case of the conventional video camera so long as the still picture pickup mode is not triggered. When the shutter button 110 is pushed at a time point $t_8$ shown in FIG. 12 after stabilization of the motion picture imaging operation, exposure for the still picture pickup operation is started from a time point $t_4$. At this time point, the mechanical shutter 102 changes linearly the iris value at a constant rate without being accompanied with any appreciable inertia, as in the case of the second embodiment. More specifically, the time taken for the mechanical shutter 102 to close is twice as long as the time taken in the second embodiment. Namely, the shutter closing time corresponds to six fields in the image pickup apparatus according to the instant embodiment. In this case, let's assume that the mechanical shutter 102 is closed, starting from the field which succeeds to the operation of the shutter button 110, i.e., from the time point $t_4$. Then, the amount of exposure for the still picture imaging will be three times as large as that of the exposure in the motion picture imaging mode effectuated during the period between the time point $t_3$ and $t_4$. Accordingly, the camera system control circuit 107 is also so designed as to sweep out the electric charges stored in the photodiodes 121 for a predetermined time determined by a method described below by making use of the electronic shutter function of the image sensor device 103 in the course of the closing operation of the mechanical shutter 102 started from the time point $t_4$.

Figure 13:
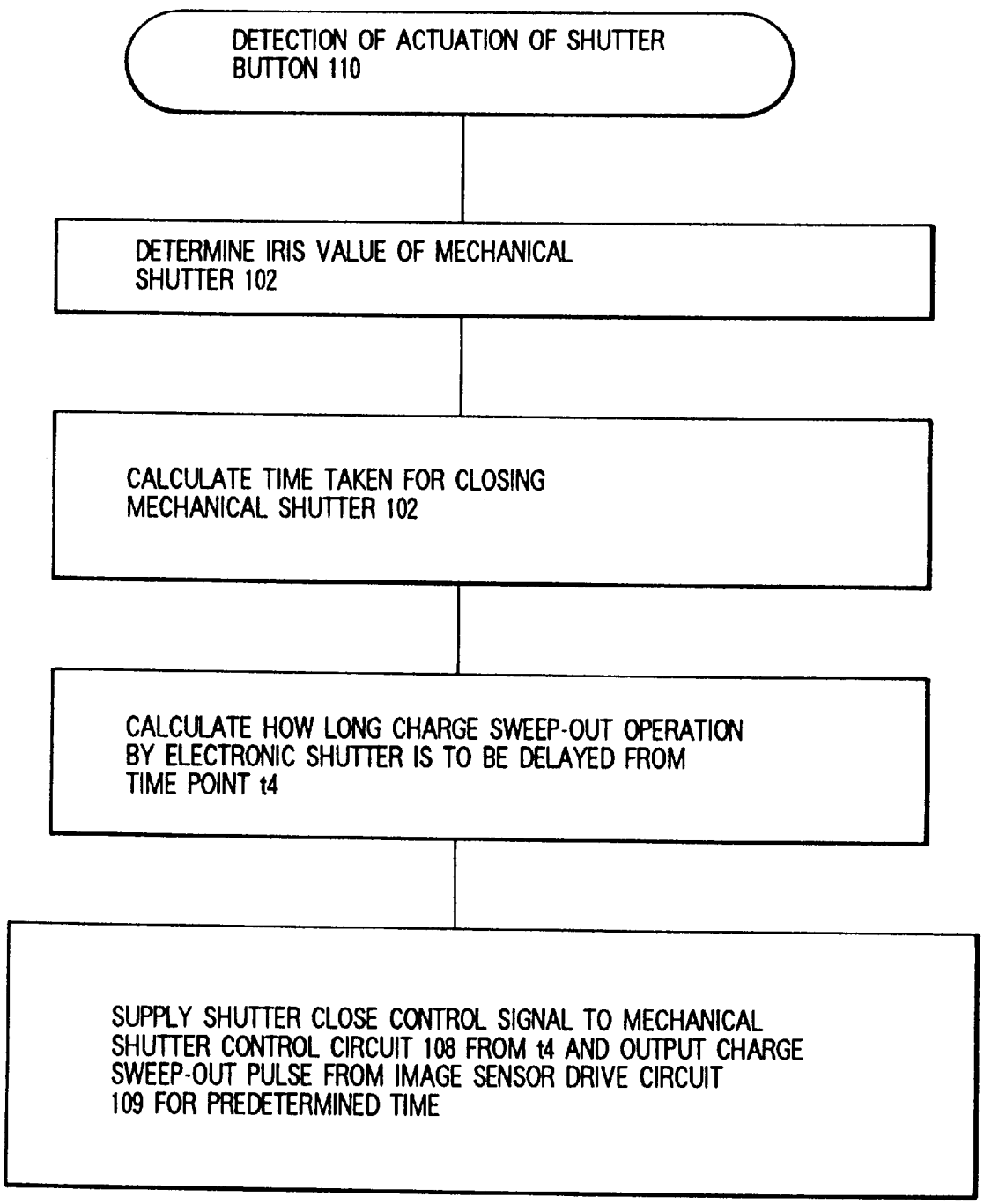
FIG. 13 is a flow chart for illustrating a series of operations involved in an exposure control processing in an image pickup apparatus according to still another embodiment of the invention.

FIG. 13 is a flow chart for illustrating a series of operations involved in the processing for outputting the shutter close control signal to the mechanical shutter control circuit 108 after lapse of the aforementioned predetermined time calculated by the camera system control circuit 107 from the time point at which the shutter button was pushed. Referring to the figure, when the shutter button 110 is pushed, the shutter close control signal is inputted to the camera system control circuit 107, which responds thereto by determining the current iris value of the mechanical shutter 102 to thereby determine the time required for the mechanical shutter 102 to close, starting from the current iris value of the mechanical shutter 102. Subsequently, it is determined how long the charge sweep-out operation should be performed with the aid of the electronic shutter function described previously from the time point $t_4$ in order to secure for the still picture pick-up the amount of exposure which is 1.5 times as large as the exposure in the motion picture imaging mode. The camera system control circuit 107 responds to the depression of the shutter button 110 to thereby output the shutter closing control signal to the mechanical shutter control circuit 108 for causing the mechanical shutter 102 to be closed at the time point $t_4$ and at the same time controls the image sensor driving circuit 104 for supplying the charge sweep-out pulses to the image sensor device 103 for the time as determined by the calculation.

At this juncture, it should be mentioned that the camera system control circuit 107 includes a detector for detecting the iris value of the mechanical shutter 102 and a circuit for arithmetically determining or calculating the aforementioned predetermined time required for ensuring for the image sensor device 103 the amount of exposure for the sill picture pick-up which is 1.5 times as large as that of the exposure in the motion picture imaging mode on the basis of the current iris value detected by the detector and the time taken for the mechanical shutter 102 to close, although the detector and the calculating circuit are omitted from illustration. In the case of the image pickup apparatus according to the instant embodiment of the invention, the aforementioned predetermined time is so set as to be substantially equal to the duration of one field in order to ensure the amount of exposure for the still picture pick-up which is 1.5 times as large as that of the exposure in the motion picture imaging mode. Parenthetically, it goes without saying that when illuminance of the object being picked up is lower, which in turn means that the exposure becomes correspondingly greater, the predetermined time defined previously should correspondingly be elongated.

Further, since the video signal generated during the period between the time points $t_4$ and $t_7$ can not be read out more than once, the video signal as read out should be stored once in a storage medium such as a memory so as to be outputted to a computer or the like image processing apparatus as the still picture data, as occasion requires. Additionally, it should be noted that during the period from the time point $t_4$ to a time point at which the mechanical shutter 102 is closed, generation of the ternary pulses of the vertical transfer pulse signals 1 and 3 is stopped to thereby suspend the operation for reading out the signal charges from the photodiodes 121.

Embodiment 5

Figure 14:
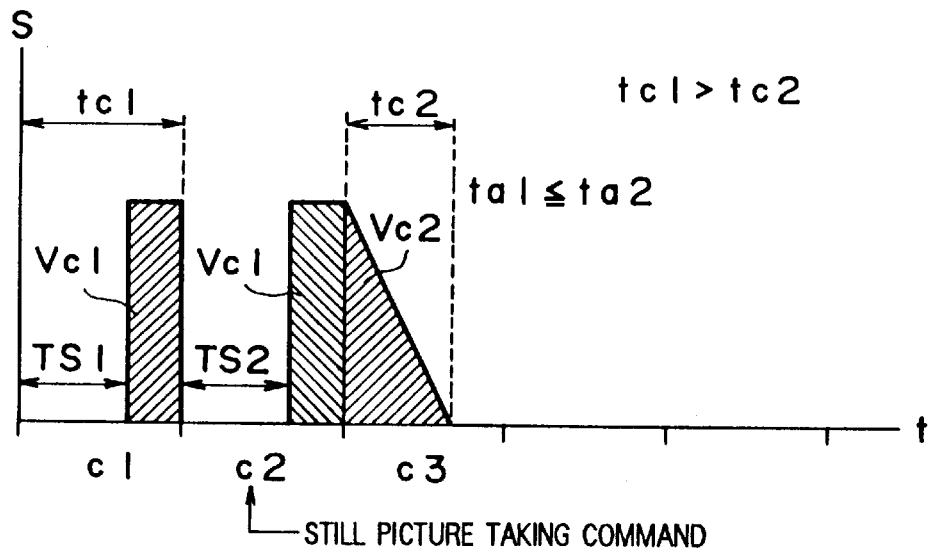
FIG. 14 is a view for graphically illustrating an exposure control in a motion picture imaging mode and a still picture pickup mode of an image pickup apparatus according to a further embodiment of the invention.
Figure 15:
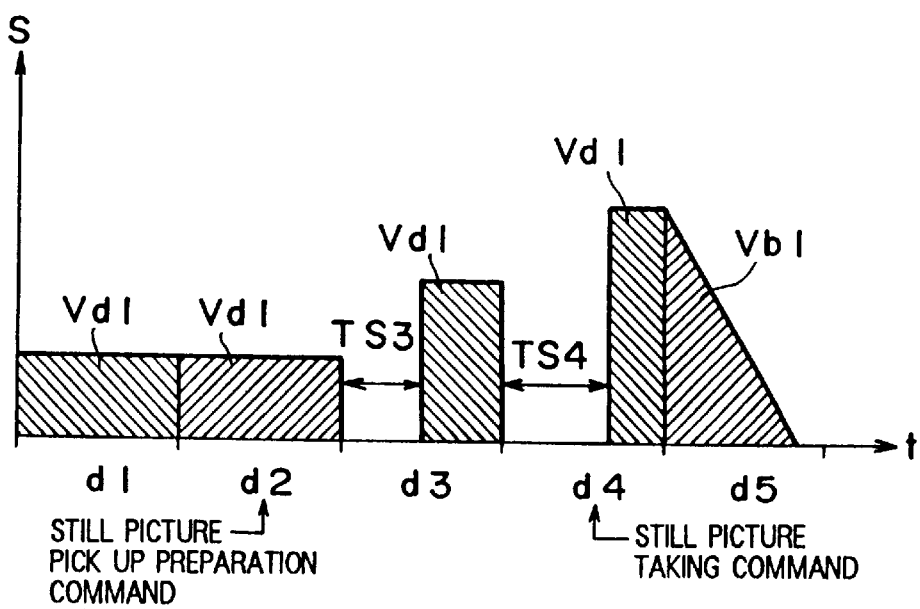
FIG. 15 is a view for graphically illustrating an exposure control in a motion picture imaging mode and a still picture pickup mode of an image pickup apparatus according to yet further embodiment of the invention.

A fifth embodiment of the present invention will be described by reference to FIGS. 14 and 15. According to the teachings of the invention incarnated in the instant embodiment, the electronic shutter function of the image sensor device and an iris diaphragm or an aperture stop are controlled in such manner as illustrated in FIGS. 14 and 15 with a view to solving the problems of the conventional techniques explained hereinbefore by referring to FIGS. 1A and 1B. Parenthetically, in the following, description concerning the CCD sweep-out pulses is omitted.

Figure 1B:
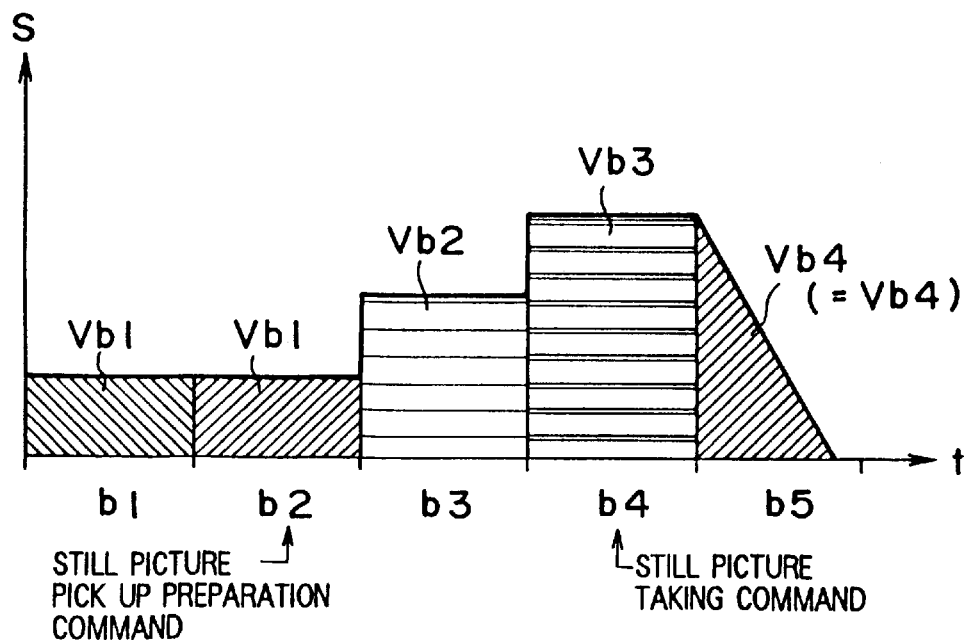

In FIGS. 14 and 15, matters having same contents as those shown in FIGS. 1A and 1B are denoted by like reference symbols and repeated description thereof is omitted. Parenthetically, characters "C1" to "C3" and "d1" to "d5" appearing in FIGS. 14 and 15 represent codes for identifying individual fields, respectively.

Further, reference symbol tc1 represents a time of one field and tc2 represent a time of exposure in the field c3 in the still picture pickup mode. It is assumed that a still picture taking command is issued in the field c2 shown in FIG. 14 and in the field d4 shown in FIG. 15. Further, it is assumed that a still picture pickup preparation command is issued in the field d2 shown in FIG. 15. Additionally, reference symbols TS1 to TS4 in FIGS. 14 and 15 designate periods during which the signal charges are swept out by the electronic shutter function.

According to the concept illustrated in FIG. 14, the still picture pickup operation is performed on the basis of the iris value under the exposure control based on the electronic shutter function in the state in which the stop or iris diaphragm is opened rather widely so that the time of exposure in the still picture pickup mode can be shortened while ensuring a sufficient amount of exposure because of a large aperture or iris value.

On the other hand, according to the concept of the invention illustrated in FIG. 15, the electronic shutter speed is updated when the iris diaphragm is once shifted toward a full-open position in precedence to performing the still picture pickup operation so that motion picture can be taken under proper exposure conditions immediately before entering into the still picture pickup mode. Further, the time of exposure in the still picture pickup mode can be shortened while ensuring a sufficient amount of exposure because of a large aperture or iris value.

Embodiment 6

Figure 16:
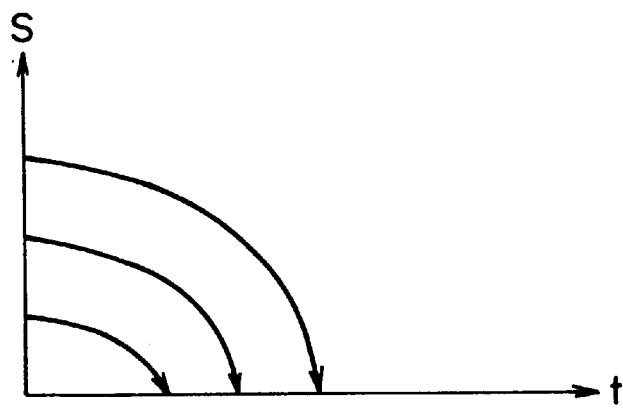
FIG. 16 is a view for graphically illustrating, by way of example, closing characteristics of an iris diaphragm employed in an image pickup apparatus.

Next, a sixth embodiment of the invention will be described by reference to FIGS. 16 and 17. FIG. 16 is a view for graphically illustrating, by way of example, closing characteristics of a meter-type iris diaphragm typifying those employed in video cameras for domestic use.

In FIG. 16, an aperture area S is taken along the ordinate with a time t being taken along the abscissa. In the case of the fifth embodiment described previously by reference to FIGS. 14 and 15, it is assumed that the aperture area of the iris diaphragm decreases linearly to the closed position. In most of actual applications, however, the iris diaphragm exhibits such closure characteristic that closing of the iris diaphragm is accelerated progressively as a function of time, as can be seen in FIG. 16.

This can be explained by the fact that the iris diaphragm is generally so designed that the aperture area S thereof decreases in proportion to a square of moving speed of blades of the iris diaphragm, and thus the aperture area S of the iris diaphragm decreases at an increasing rate as a function of time lapsed from a time point at which the closing of the iris diaphragm is started. In other words, the rate at which the aperture area S changes increases as the iris diaphragm approaches closer to the closed position. This makes it difficult to control the amount of exposure by resorting to the use of the iris diaphragm.

Figure 17:
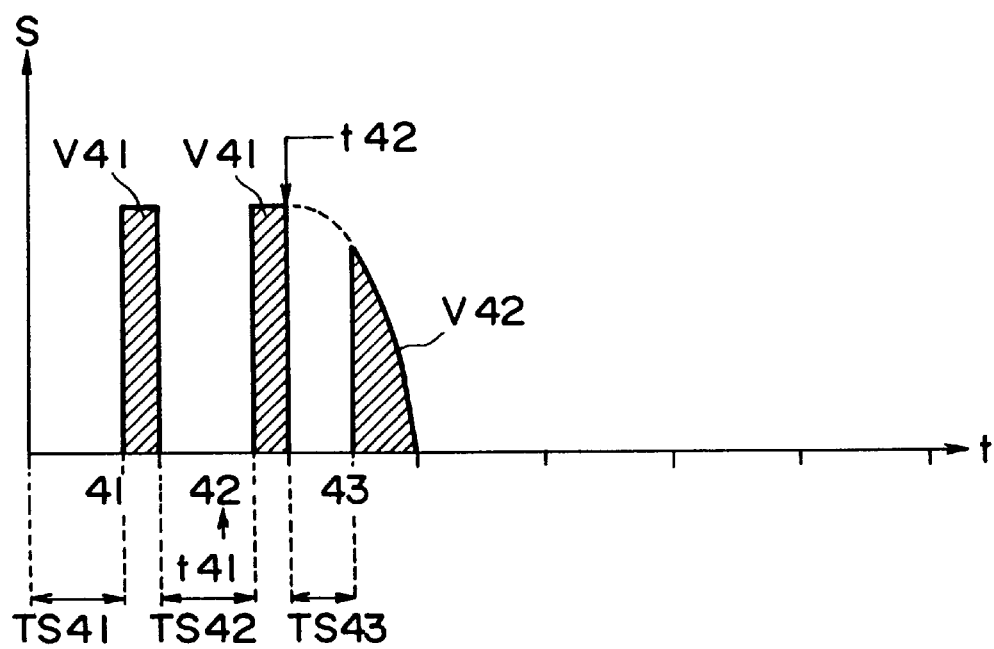
FIG. 17 is a diagram for illustrating an exposure control in a still picture pickup mode and a motion picture imaging mode of an image pickup apparatus according to still further embodiment of the invention.

FIG. 17 is a diagram for illustrating the exposure control in the still picture pickup mode according to the instant embodiment of the invention. In this conjunction, it should be mentioned that in the image pickup apparatus according to the instant embodiment, there is employed an iris diaphragm whose closing speed is slower than that of the iris diaphragm employed in the fifth embodiment described previously. In FIG. 17, the aperture area S is taken along the ordinate with the time t being taken along the abscissa. Further, reference numerals 41, 42 and 43 designate the fields, respectively, while symbols V41 and V42 represent the amounts of exposures during a period for the still picture pickup preparation and during the still picture pickup operation, respectively. Additionally, t41 and t42 designate timings for control processings to be effectuated, and TS41 to TS43 represent periods, respectively, during which the signal charges generated through photoelectric conversion by the photodiodes of the image sensor device are swept out under the effect of the electronic shutter function.

When a still picture taking command is issued at the time point t41, the iris diaphragm starts the closing operation at the time point t42 which corresponds to the beginning of the field 43. During the period TS43 in which the closing operation of the iris diaphragm is in progress, the signal charges are swept out so that the amount of exposure V41 in the still picture pickup preparation period coincides with the amount of exposure in the still picture pickup operation. Although it is described that the amounts of exposures V41 and V42 are equal to each other, this is only for convenience of description. As mentioned previously, it is preferred that the amount of exposure V42 is twice as large as the amount of exposure V41 (i.e., V42=2×V41).

As can now be appreciated from the foregoing, according to the invention incarnated in the instant embodiment, the exposure time in the still picture pickup operation can be shortened even in the case where a relatively lot of time is involved in closing the iris diaphragm, because the electric charges (i.e., signal charges) are swept out in synchronism with the iris diaphragm closing operation in succession to the start thereof. During the still picture pickup preparation period provided according to the instant embodiment of the invention, the motion picture information can be outputted. Accordingly, the motion picture imaging operation may be carried out during this still picture pickup preparation period. The amount of exposure V41 in the still picture pickup preparation period may be determined on the basis of an output signal of a photometric circuit provided separately from the imaging system. Alternatively, the amount of exposure V41 may arithmetically be determined on the basis of the shutter speed and the iris value in the exposure control state. Finally, although it has been described that the amount of exposure V41 in the still picture pickup preparation period is equal to the amount of exposure V42 in the still picture pickup mode, the ratio between the amounts of exposures V41 and V42 may be selected to be "2" as mentioned preciously or in more general to be a given number n.

Embodiment 7

Figure 18:
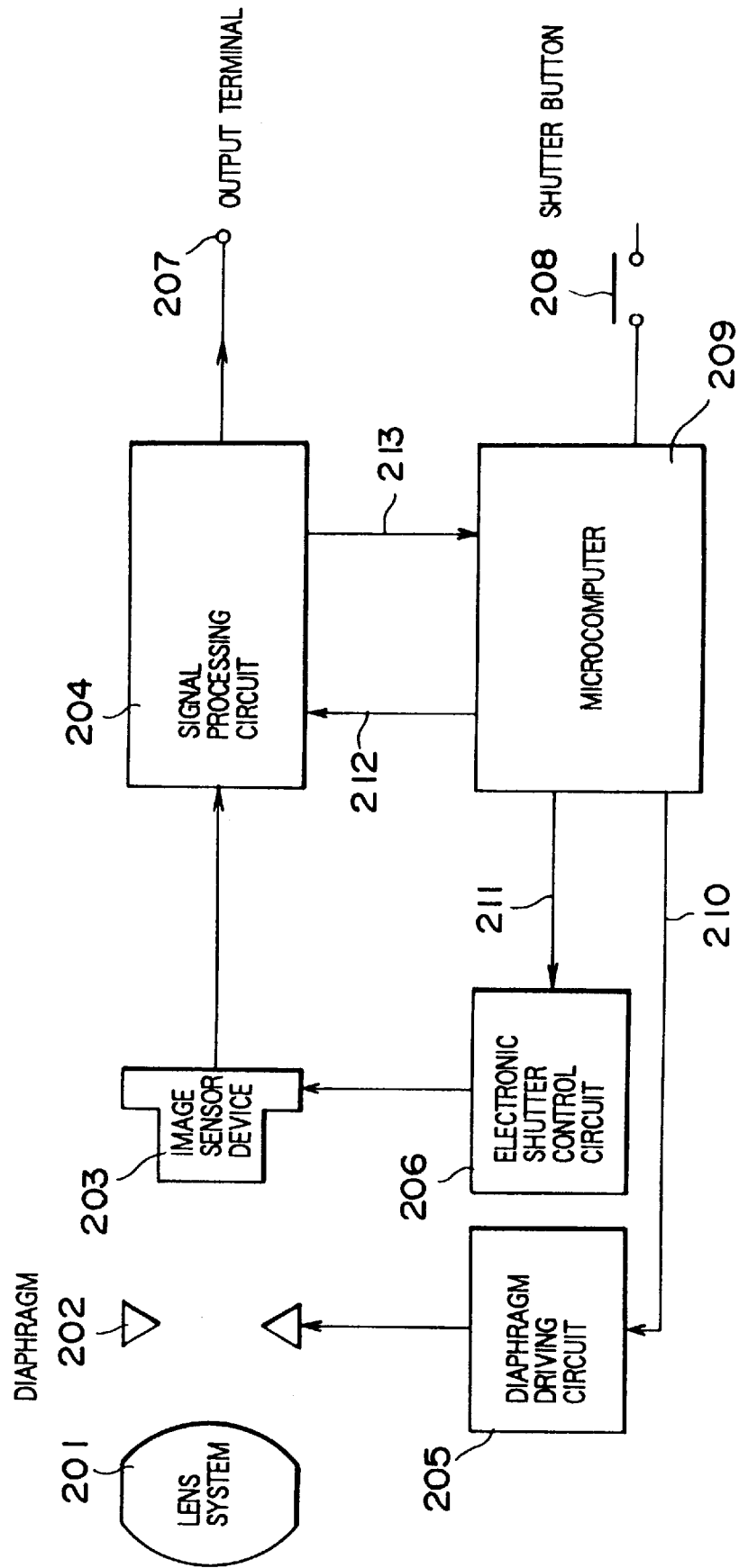
FIG. 18 is a block diagram showing a structure of an image pickup apparatus according to another embodiment of the present invention.

A seventh embodiment will be described by reference to FIGS. 17, 18 and 19, wherein FIG. 18 is a block diagram showing a structure of an image pickup apparatus according to the instant embodiment. Incidentally, it should be mentioned that eighth and ninth embodiments of the invention described hereinafter are also directed to the image pickup apparatus implemented in the substantially same structure as that shown in FIG. 18.

Referring to FIG. 18, the image pickup apparatus is comprised of a lens system 201, an iris diaphragm 202, an image sensor device or an imager 203, a signal processing circuit 204 for generating motion pictures and still pictures, an iris diaphragm drive circuit 205, an electronic shutter control circuit 206, an output terminal 207, a shutter button 208, and a microcomputer 209 which is in charge of controlling the whole system. The microcomputer 209 is so programmed as to execute processings involved in the control of the image pickup apparatus of the structure described above.

The signal processing circuit 204, the iris diaphragm driving circuit 205 and the electronic shutter control circuit 206. mentioned above are controlled by a gain control signal 212, an iris control signal 210 and a electronic shutter speed control signal 211, respectively, which are supplied from the microcomputer 209.

Referring to FIG. 18, light rays impinging onto the image sensor device 203 via the lens system 201 and the iris diaphragm 202 are converted into electric signals which are then inputted to the signal processing circuit 204. The signal processing circuit 204 in turn converts the input electric signal to a video signal such as NTSC signal conforming to the broadcast standards, wherein the video signal is outputted via the output terminal 207. Besides, the signal processing circuit 204 outputs signal information 213 to the microcomputer 209. On the basis of the signal information 213, the microcomputer 209 outputs the electronic shutter speed control signal 211, the gain control signal 212 and the iris control signal 210 for thereby controlling the shutter speed, the signal gain and the iris value (i.e., aperture value of the iris diaphragm). Same holds true for the embodiments described hereinafter, unless otherwise specified.

Figure 19:
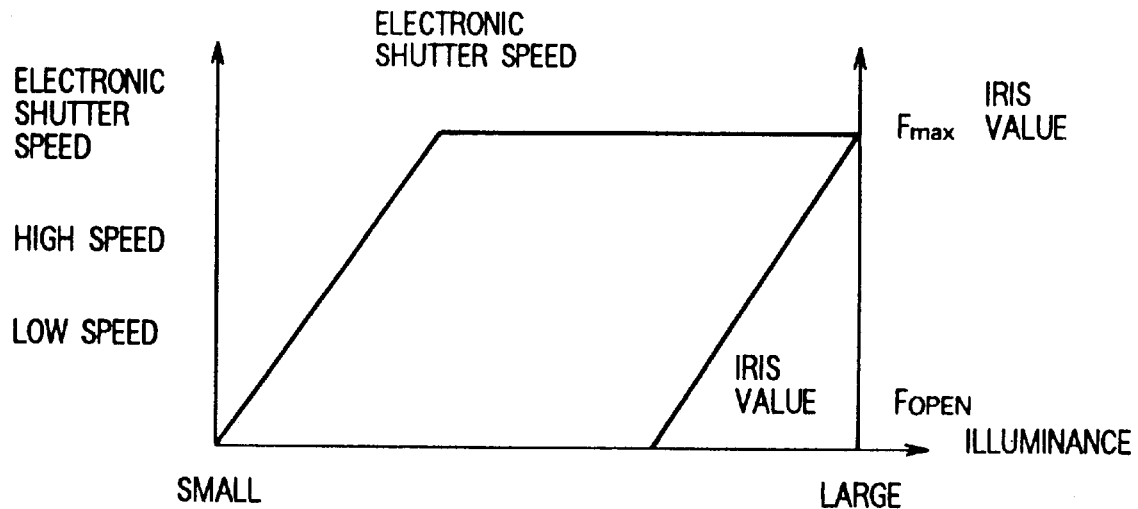
FIG. 19 is a view for illustrating graphically exposure control in the image pickup apparatus shown in FIG. 18.

FIG. 19 is a view for illustrating graphically exposure control characteristics of the image pickup apparatus according to the instant embodiment in the motion picture imaging mode. In the figure, the electronic shutter speed and the iris value are taken along the ordinate with illuminance being taken along the abscissa. Although the electronic shutter speed and the iris value are taken along the same axis, it is self-explanatory that they are scaled in different units. The illuminance may be arithmetically determined on the basis of the amount of exposure which the image sensor device undergoes. Alternatively, an appropriate photometer may be provided to this end.

As can be seen in FIG. 19, when illumination of the object whose picture being taken varies from low illuminance to high illuminance with the quantity of incident light being increased, the iris control signal 210 will remain invariable, whereas the electronic shutter speed is caused to increase progressively in response to the electronic shutter speed control signal 211. When the quantity of light further increases with the electronic shutter speed exceeding the control range preset therefor, the iris value of the diaphragm 202 increases, whereby the exposure control is effected by the iris diaphragm 202. Reversely, when the quantity of incident light decreases from the state where the exposure control is performed by varying the iris diaphragm 202 under high illuminance, the iris diaphragm 202 is shifted in the opening direction. After the iris diaphragm 202 is fully opened, the exposure control is then performed by lowering the electronic shutter speed by the electronic shutter speed control signal 211.

In this manner, according to the teaching of the invention incarnated in the instant embodiment, the exposure time can be shortened by setting the iris diaphragm 202 to the opened in the still picture pickup mode. Besides, the exposure control is additionally performed by the iris diaphragm 202 so that the exposure time determined by the electronic shutter does not become extremely short.

FIG. 17 is a timing chart for illustrating the exposure control according to the instant embodiment in the still picture pickup mode. Reference symbols shown in FIG. 17 have same meanings as those described previously in conjunction with the sixth embodiment except that the symbol V41 represents the amount of exposure in the motion picture imaging mode. As can be seen in FIG. 17, the exposure control in the motion picture imaging operation (i.e., during the fields 41 and 42) is effected by increasing or decreasing the period TS by the electronic shutter speed control signal 211 with the iris diaphragm 202 being opened so that the exposure time in the still picture pickup operation (i.e., during the field 43) can be shortened. However, in the case where the control must be performed with a control quantity exceeding the control range preset for the electronic shutter speed control signal 211 in order to ensure the proper exposure control, the iris diaphragm 202 is moved in the closing direction.

The microcomputer incorporates a read-only memory or ROM which stores data indicating changes in the aperture area of the iris diaphragm 202 as a function of the times taken for the iris diaphragm 202 to close from the various iris values, respectively. Hereinafter, this data will be referred to as the closing operation characteristic data of the iris diaphragm 202.

Upon detection of actuation of the shutter button 208 at a time point t41 in the field 42, the microcomputer 209 then calculates the current amount of exposure on the basis of the iris control signal 210 and the electronic shutter speed control signal 211.

Subsequently, on the basis of the result of the calculation mentioned above and the closing operation characteristic data of the iris diaphragm 202, the timing for starting the closing operation of the iris diaphragm 202 and the period during which the electric charges are to be swept out by the iris control signal 210 are calculated.

In the following description, it is assumed that the exposure control is so performed that the condition n=1 is satisfied (i.e., the amount of exposure in the still picture pickup operation is equal to the amount of exposure in the motion picture imaging operation). Of course, it is preferred that n is equal to "2".

In accordance with the result of the calculation mentioned above, the microcomputer 209 sets the shutter speed at the electronic shutter control circuit 206 by using the electronic shutter speed control signal 211 during a period corresponding to the field 42. Subsequently, in synchronism with the field 43, the microcomputer 209 issues a command for closing the iris diaphragm 202 (hereinafter referred to as the iris diaphragm closing command) to the iris diaphragm driving circuit 205 at a time point t42. In response to this iris diaphragm closing command, the iris diaphragm 202 starts to move in the closing direction. During the period corresponding to the field 43, the electric charges are swept out from the pixels of the image sensor device 203 during the period set in the field 42, whereby the exposure time in the still picture pickup mode is adjusted.

As a result, the amount of exposure V41 in the motion picture imaging mode becomes equal to the amount of exposure V42 in the still picture pickup mode. The signal is read out after closure of the iris diaphragm 202 to be subsequently outputted by way of the signal processing circuit 204.

As is apparent from the foregoing, in the image pickup apparatus according to the instant embodiment of the invention, the exposure control is performed by using with priority the electronic shutter controlled by the electronic shutter speed control signal 211 for opening the iris diaphragm 202. Thus, the exposure time in the still picture pickup mode can be shortened. In this manner, the still picture and the motion picture can be generated with the image pickup apparatus of a simplified structure while protecting the resolution against degradation. Further, since the operation for opening once the iris diaphragm 202 is rendered unnecessary, the time lag intervening between actuation of the shutter button 208 and the picking-up of the still picture can be shortened.

Embodiment 8

Next, an image pickup apparatus according to an eighth embodiment of the invention will be described by reference to FIGS. 18, 20, 21 and 22. Parenthetically, the structure of the image pickup apparatus is essentially identical with the apparatus described previously in conjunction with the seventh embodiment by reference to FIG. 18.

Figure 20:
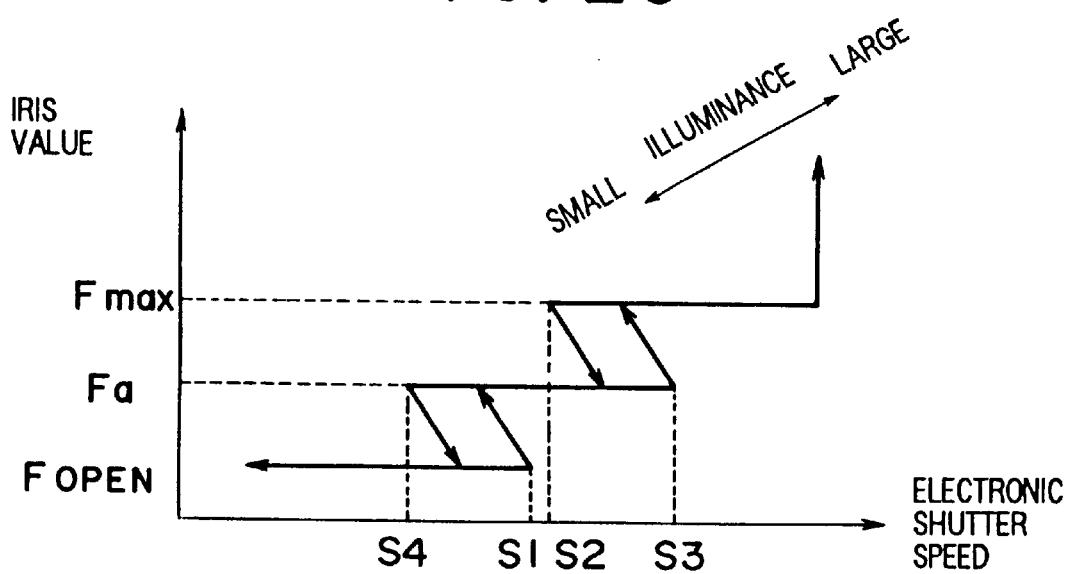
FIG. 20 is a view for graphically illustrating exposure control in an image pickup apparatus according to still another embodiment of the invention.

FIG. 20 is a view for graphically illustrating exposure control characteristics of the image pickup apparatus according to the instant embodiment. In the figure, iris value is taken along the ordinate with the electronic shutter speed being taken along the abscissa. The exposure control according to the instant embodiment is realized as what is called the programmed automatic exposure in which the iris value and the electronic shutter speed are automatically controlled and set.

In the case of the example shown in FIG. 20, the exposure control is performed by the electronic shutter with the iris diaphragm being fixed to the opened state (represented by Fopen), wherein when the electronic shutter speed reaches a speed S1, the iris value is changed to a value Fa. Further, when the illuminance increases and when the electronic shutter speed attains the level S3, the iris value is changed to a value Fmax. Similarly, when the illuminance becomes low, the iris value is changed when the electronic shutter speed is at levels S2 and S4, respectively. In this manner, in the exposure control in the motion picture imaging mode, the electronic shutter is used with preference. However, differing from the exposure control illustrated in FIG. 19, the iris value is changed even within the control range of the electronic shutter speed control signal 211. The purpose of such exposure control is to prevent the exposure time for the still picture pickup operation from becoming too short.

In the case of the exposure control illustrated in FIG. 20, the minimum iris value (F value) (i.e., the iris or F-value in the state in which the iris diaphragm 202 is opened to a maximum) is represented by Fopen with the maximum iris value being represented by Fmax, wherein an available iris value between the values Fopen and Fmax is represented by Fa. It should however be understood that two or more discrete iris values may be set between the minimum iris value Fopen and the maximum iris value Fmax.

Assuming, by way of example, that the exposure time in the still picture pickup mode is shortened progressively, the sweep-out of the electric charges will be performed up to a time point immediately before the time point at which the iris diaphragm 202 is closed. Consequently, the period of exposure in which the iris value is effective, i.e., the period from the time point at which the charge sweep-out operation is completed to a time point at which the iris diaphragm 202 is closed becomes shorter, meaning that the electronic shutter speed becomes higher. Thus, a steep portion of the closing characteristic curve of the iris diaphragm 202 shown in FIG. 19 is used.

More specifically, the aperture area of the iris diaphragm 202 decreases progressively as a function of time lapse after the start of closing operation of the iris diaphragm 202. In this conjunction, it should be recalled that the aperture area of the iris diaphragm 202 decreases steeply as the area becomes smaller. As a consequence, even a slight delay in response in the closing operation of the iris diaphragm 202 will exert significant influence to the exposure control, involving error in the amount of exposure. This in turn means that as the illuminance is higher and as the shutter time is shorter, temporal deviation in the closing operation of the iris diaphragm 202 as well as variation or deviation in the closing operation speed of the iris diaphragm 202 is more likely to exert influence to the amount of exposure.

Figure 21:
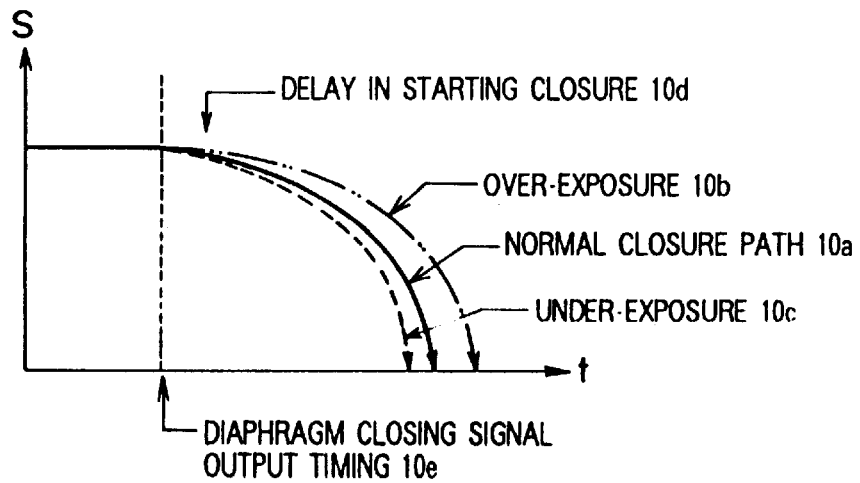
FIG. 21 is a view for illustrating graphically variations in closing operation of a diaphragm.

This will be explained by referring to FIG. 21. In the figure, a curve 10a represents a path along which the iris diaphragm 202 is closed in a normal operation. However, when the closing operation is accompanied with a delay as indicated at 10d, the amount of exposure becomes excessively large as indicated by a curve 10b. On the other hand, when the iris diaphragm 202 closes at a higher speed due to reduction in the friction among the iris diaphragm blades as brought about upon change of posture of a picture taking sensor or camera, the amount of exposure becomes excessively small, as indicated by a curve 10c. Needless to say, it is difficult to predict occurrence of these variations in the amount of exposure.

Under the circumstances, it is required to perform the exposure control by using the iris control signal 210 and the electronic shutter speed control signal 211 so that a proper exposure time can be realized with error attributable to the closing operation of the iris diaphragm 202 being suppressed to a minimum while assuring a sufficiently high shutter speed in the still picture pickup mode.

Figure 22:
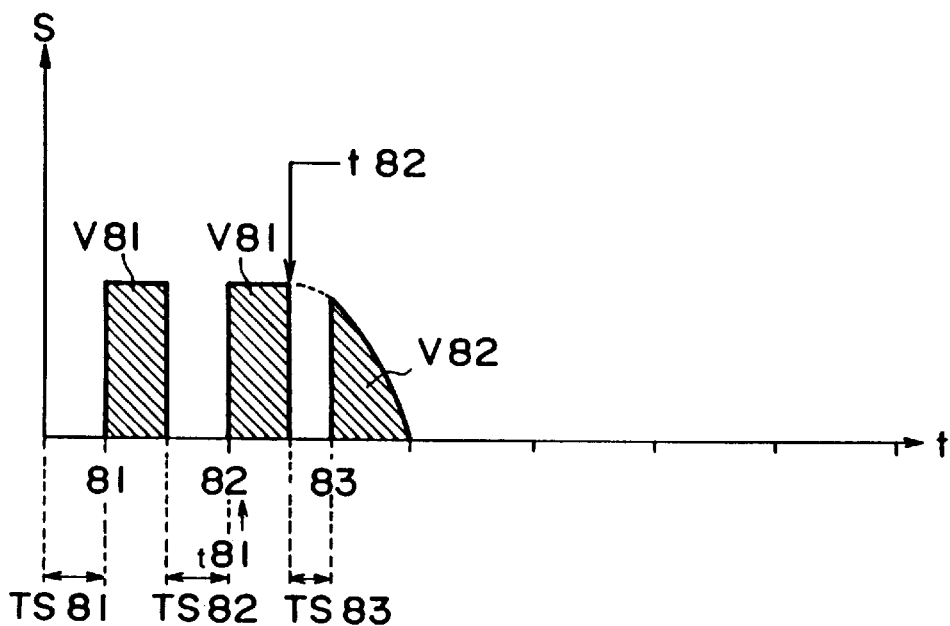
FIG. 22 is a view for graphically illustrating exposure control in a still picture pickup mode and a motion picture imaging mode of an image pickup apparatus according to a further embodiment of the invention.

FIG. 22 is a view for graphically illustrating the exposure control in the still picture pickup mode according to the instant embodiment of the invention. Parenthetically, in the motion picture imaging mode, the exposure control is performed by using the iris diaphragm 202, and the electronic shutter, wherein the iris diaphragm 202 is implemented in a same structure as described hereinbefore in conjunction with the sixth embodiment.

In FIG. 22, the aperture area S is taken along the ordinate with the time t being taken along the abscissa. Further, reference numerals 81, 82 and 83 designate individual fields, respectively. Symbols V81 and V82 represents the amounts of exposure in the motion picture imaging mode and the still picture pickup mode, respectively. Further, t81 and t82 designate timings for various control processings. Additionally, TS81 to TS83 designate, respectively, the periods during which the signal charges are swept out by means of the electronic shutter. According to the invention incarnated in the instant embodiment, the exposure control in the motion picture imaging operation (field 81 and 82) is performed in dependence on the illuminance of the object through such combination of the electronic shutter speed and the iris value as shown in FIG. 20 in order to shorten the exposure time in the still picture pickup mode (field 83).

Upon detection of actuation of the shutter button 208 at a time point t81 in the field 82, the microcomputer 209 then calculates the current amount of exposure on the basis of the iris control signal 210 and the electronic shutter speed control signal 211. Subsequently, on the basis of the result of the calculation and the closing operation characteristic data of the iris diaphragm 202 mentioned previously, the timing for starting the closing operation of the iris diaphragm 202 and the timing for terminating the charge sweep-out operation performed under the control of the electronic speed control signal 211 are arithmetically determined or calculated.

In accordance with the result of the calculation mentioned above, the microcomputer 209 sets the electronic shutter speed in the electronic shutter control circuit 206 by using the electronic shutter speed control signal 211 at timing of the field 82. Subsequently, at the time point t82 corresponding to the start of the field 83, the microcomputer 209 issues. a command for closing the iris diaphragm 202 to the diaphragm driving circuit 205. In response to this iris diaphragm closing command, the iris diaphragm 202 starts to move in the closing direction from the same iris value as that in the motion picture imaging operation. In the field 83, the electric charges are swept out during the period set in the field 82, whereby the exposure time in the still picture pickup mode is adjusted. As a result of this, the amount of exposure V81 in the motion picture imaging mode becomes equal to the amount of exposure v 82 in the still picture pickup mode. The signal is read out after closure of the iris diaphragm 202 to be subsequently outputted by way of the signal processing circuit 204.

As is apparent from the foregoing, in the image pickup apparatus according to the instant embodiment of the invention, the exposure control is performed by using the electronic shutter speed control signal 211 with the iris diaphragm 202 being moved in the closing direction as the illuminance becomes higher in the motion picture imaging mode. Thus, the exposure time in the still picture pickup operation can be shortened. Besides, error possibly involved in the amount of exposure can be suppressed to a minimum.

Embodiment 9

Next, an image pickup apparatus according to an ninth embodiment, of the invention will be described by reference to FIGS. 18 and 23. Parenthetically, the structure of the image pickup apparatus is essentially identical with the apparatus described previously in conjunction with the seventh and eighth embodiments and shown in FIG. 18.

Figure 23:
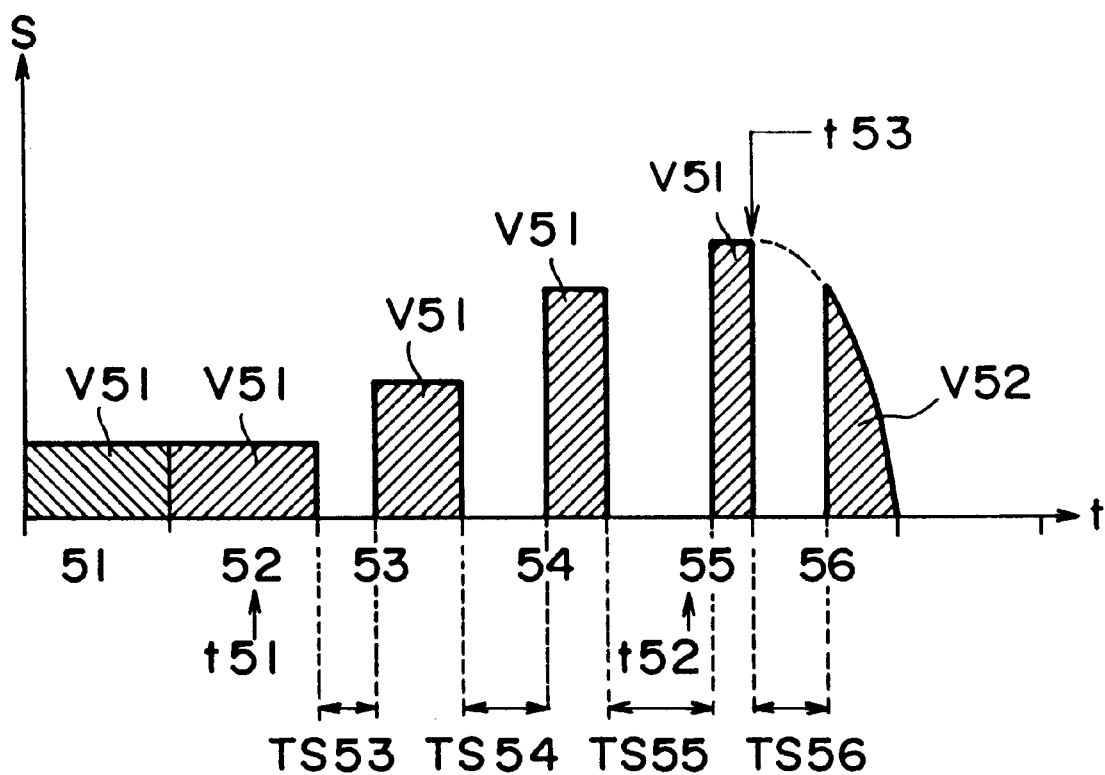
FIG. 23 is a view for graphically illustrating exposure control in a still picture pickup mode and a motion picture imaging mode of an image pickup apparatus according to another embodiment of the invention.

FIG. 23 is a diagram for illustrating the exposure control according to the instant embodiment of the invention. In this figure, the aperture area S is taken along the ordinate with the time t being taken along the abscissa. Further, reference numerals 51 to 56 designate fields, respectively, while V51 and V52 represent the amounts of exposures in the motion picture imaging operation and the still picture pickup operation, respectively. Additionally, t41 and t42 designate timings for various control processings to be effectuated, and TS53 to TS56 represent periods, respectively, during which the signal charges are swept out by means of the electronic shutter. The fields 51 and 52 correspond to the motion picture imaging periods, respectively, while the fields 53 to 55 correspond to the still picture pickup preparation periods, respectively, during which the motion picture imaging operation is continued. The field 56 represents the still picture pickup period. In the motion picture imaging mode, the charge sweep-out pulse is outputted so that the exposure time coincides with the field period, to thereby restrict the quantity of light by the iris diaphragm 202. The iris diaphragm 202 employed in the image pickup apparatus according to the instant embodiment is similar to that described hereinbefore in conjunction with the sixth embodiment.

In the case of the image pickup apparatus according to the seventh embodiment, the iris diaphragm 202 is maintained at a position close to the fully opened state with the electronic shutter being operated with priority or preference in order to shorten the exposure time in the still picture pickup operation. However, such exposure control method is disadvantageous in the following respects.

(1) Because the iris diaphragm is used at the position close to the fully opened state, it is impossible to secure a large depth of field.

(2) Since the exposure control is performed preferentially with the electronic shutter, there make appearance flickers under illumination of a fluorescent lamp due to difference between the field frequency of the video signal and the frequency of power supply. Such flicker will become more remarkable particularly when a high-speed electronic shutter is employed, which is of course unfavorable to the pickup of the motion picture.

With the instant embodiment of the invention, it is contemplated to perform the exposure control in the motion picture imaging mode by operating the iris diaphragm 202 with preference while maintaining the electronic shutter speed at a low level with a view to solving the problems mentioned above. By virtue of this feature, the motion picture imaging operation comparable to that of the video camera for home use can be ensured.

Next, description will be directed to the exposure control in the still picture pickup mode. Upon detection of depression of the shutter button 208 at the time point t51 shown in FIG. 23 during the motion picture imaging operation, the microcomputer 209 calculates the current amount of exposure on the basis of the iris control signal 210 and the electronic shutter speed control signal 211. Subsequently, the microcomputer 209 calculates on the basis of the current iris value the time taken for opening the iris diaphragm 202 as well as displacement thereof. In succession, the microcomputer 209 arithmetically determines the electronic shutter speed for the succeeding field 53 on the basis of the calculated amount of exposure and the displacement or shift of the iris diaphragm 202 for the field 53. The electronic shutter speed determined in this manner is set at the electronic shutter control circuit 206 by the electronic shutter speed control signal 211 at the timing of the field 52.

In the fields 53 and 54, the speed of the electronic shutter for the succeeding field is calculated on the basis of the amount of exposure and the displacement or shift of the iris diaphragm 202 in each of the fields 53 and 54 in the same manner as described above for the field 52, and the electronic shutter speed thus determined is set at the electronic shutter control circuit 206. The iris diaphragm 202 is displaced or moved toward the open state progressively over the periods of the fields 53, 54 and 55. Upon detection of the open state of the iris diaphragm 202 at the time point t 52, the microcomputer 209 calculates the current amount of exposure on the basis of the current iris value control signal 210 and the electronic shutter speed control signal 211. On the basis of the result of this calculation and the closing operation characteristic data of the iris diaphragm 202, the microcomputer 209 calculates the timing for starting to close the iris diaphragm 202 and the timing for terminating the signal charge sweep-out operation performed by the iris control signal 210.

The microcomputer 209 sets the results of the calculation mentioned above at the electronic shutter control circuit 206 by using the electronic shutter speed control signal 211 at the timing of the field 55. Subsequently, at the time point t53 coinciding with the beginning of the field 56, the microcomputer 209 outputs the iris diaphragm closing command to the diaphragm driving circuit 205 to thereby allow the iris diaphragm 202 to start to move in the closing direction. In the field 56, the exposure time is adjusted by sweeping out the signal charges during the period set in the field 55. As a result of this, the amount of exposure V51 in the motion picture imaging mode becomes equal to the amount of exposure V52 in the still picture pickup mode in the case of the image pickup apparatus according to the instant embodiment of the invention. The video signal is read out after closure of the iris diaphragm to be subsequently outputted via the signal processing circuit 204.

As is apparent from the above, in the image pickup apparatus according to the instant embodiment of the invention, the iris diaphragm 202 is moved or shifted once in the opening direction and at the same time the electronic shutter speed is so controlled that the amount of exposure equivalent to that for the motion picture taking operation can be ensured, when the still picture taking command is issued. Thus, the proper exposure can be maintained even when the iris diaphragm 202 is being shifted toward the opened state. Further, because the iris diaphragm 202 is opened after the still picture taking command is issued, which is then followed by the still picture taking operation, shortening of the exposure time in the still picture pickup operation can be realized compatibly with the exposure control which allows the iris diaphragm 202 to be operated with preference in the motion picture imaging mode.

Next, a modification of the ninth embodiment will be described. In the case of the image pickup apparatus according to the ninth embodiment, depression of the shutter button 208 at the time point t51 is interpreted as the still picture pickup command by the microcomputer 209, and the still picture pickup operation is automatically performed after the iris diaphragm 202 has been opened. However, such arrangement can also be adopted that the depression of the shutter button 208 is recognized as the still picture pickup preparation command by the microcomputer 209. In this case, the iris diaphragm 202 is moved once in the opening direction and at the same time the electronic shutter speed is updated in the manner described previously, whereon the still picture taking command is waited for when the iris diaphragm 202 is fully opened or positioned closely to the fully opened state. In this conjunction, an indicator element such as a light emission diode or liquid crystal device may be provided for informing the photographer that the still picture pickup preparation has been completed (i.e., the still picture taking operation can be performed). The state in which the iris diaphragm 202 is maintained in the fully or approximately fully opened state in response to the still picture taking command and in which the exposure control is realized by means of the electronic shutter is equivalent to the state described hereinbefore in conjunction with the seventh embodiment. Thereafter, when the shutter button 208 is again pushed, this is interpreted that the still picture taking command is issued, whereupon the still picture pickup operation is performed in the same manner as described previously in connection with the seventh embodiment.

In the modification of the ninth embodiment of the invention described above, both the still picture pickup preparation command and the still picture taking command are issued by means of the shutter button 208. However, in place of using the shutter button 208, there may externally be provided a plurality of buttons or the like devices for issuing these commands to the image pickup apparatus or alternatively a button for the still picture taking command may be provided in the image pickup apparatus separately from the shutter button 208. Besides, the button or device for issuing the still picture pickup preparation command may be implemented as a toggle selector switch for making it possible to change over the exposure control in which the iris diaphragm 202 is operated with preference with the electronic shutter speed being maintained low and the exposure control in which the electronic shutter is operated with preference with the iris diaphragm 202 being set to a position close to the opened state.

As is apparent from the above, according to the modification of the ninth embodiment, the iris diaphragm 202 is shifted once toward the opened state with the electronic shutter speed being updated in response to the still picture pickup preparation command, wherein upon issuance of the still picture taking command, the iris diaphragm 202 is closed with the electronic shutter speed being updated. Thus, reduction in the exposure time for the still picture pickup operation can be realized compatibly with the exposure control for the motion picture imaging mode in which the iris diaphragm 202 is controlled with preference. Thus, the motion picture and the still picture can be generated with the simplified and convenient exposure system.

Embodiment 10

Next, description will be made of the image pickup apparatus according to a tenth embodiment of the invention. In the image pickup apparatus employing a CCD-type image sensor device in which charge store/read operations are performed simultaneously, the video signal is susceptible to adverse influence when the charge sweep-out operation is performed during the scanning period. Accordingly, it is a common practice to effectuate the charge sweep-out operation only during the fly-back period. If otherwise (i.e., when the charge sweep-out operation is carried out during a period in which a picture is being displayed on a monitor), influence of the sweep-out pulses is likely to make appearance on the monitor screen, impairing thus the quality of picture.

For the reasons mentioned above, it has been implicitly assumed in the foregoing description that the charge sweep-out operation is performed during the fly-back period, although not pointed out particularly. However, if the problem mentioned above can be coped with, the charge sweep-out operation may then be performed at any desired timing. By way of example, it will readily be understood that the charge sweep-out operation in the still picture pickup mode may be effected during the fly-back period or the scanning period, because the timing for reading out the video signals and the timing for sweeping out the signal charges are utterly different from each other in the still picture pickup mode. If the timing for the charge sweep-out operation can be selected as desired, this means that the exposure time in the still picture pickup mode can be adjusted more finely.

Thus, according to the invention incarnated in the instant embodiment, it is taught to use as the image sensor device an inter-line type CCD, wherein in the motion picture imaging mode, the charge sweep-out operation is performed within the horizontal fly-back period by using overflow drains for the electronic shutter opening operation, while the electric charges are transferred from the pixels to the vertical CCDs by using transfer gate within the vertical fly-back period during the electronic shutter closing operation in which no video signal is generated. By virtue of this arrangement, it is possible to adjust finely the exposure time. On the other hand, in the still picture pickup mode, the electronic shutter opening operation is performed at a given timing by using the overflow drains while the closing operation is effected by closing the iris diaphragm. Thus, the exposure time can finely be adjusted in the still picture pickup mode as well. In this manner, the fine or accurate exposure time adjustment can be accomplished in both the motion picture imaging mode and the still picture pickup mode. Of course, similar effects can be achieved by adjusting the iris diaphragm closing timing.

Embodiment 11

Figure 24:
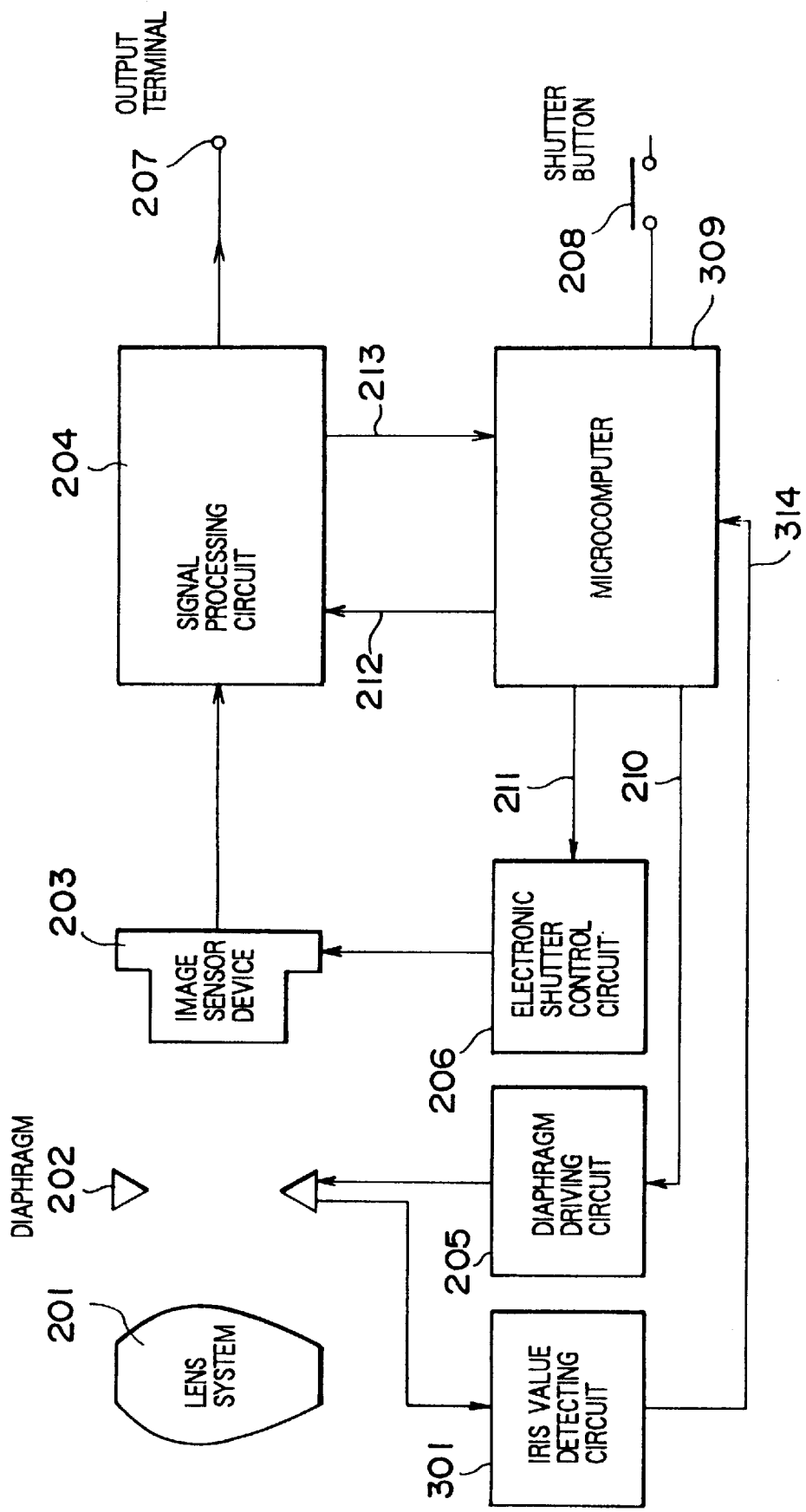
FIG. 24 is a block diagram showing a structure of an image pickup apparatus according to yet another embodiment of the present invention.

Now, an eleventh embodiment of the present invention will be described by reference to FIGS. 21, 24 and 25, wherein FIG. 24 is a block diagram showing a structure of an image pickup apparatus according to the instant embodiment. In FIG. 24, components which are same as or equivalent to those shown in FIG. 18 are denoted by like reference symbols, and repeated description thereof is omitted. Incidentally, it should be added that the arrangement shown in FIG. 24 can be adopted in each of the embodiments other than the seventh, eighth and ninth ones, being however understood that the image pickup apparatuses according to the seventh to ninth embodiments may be implemented in the structure shown in FIG. 24 when occasion requires.

In FIG. 24, a reference numeral 301 denotes an iris value detecting circuit for detecting changes in the iris value of the iris diaphragm 202, and a numeral 314 designates an iris value detection signal outputted from the iris value detecting circuit 301 and inputted to a microcomputer 309.

As explained previously by referring to FIG. 21, variances or deviations difficult to predict will take place due to various factors in the curse of closing operation of the iris diaphragm, which results in errors intervening in the exposure. However, when the causes for these deviations can be identified (i.e., the states prevailing during the iris diaphragm closing operation can be decided), it is possible to cancel out the error and reconstruct the still picture with correct exposure.

Figure 25:
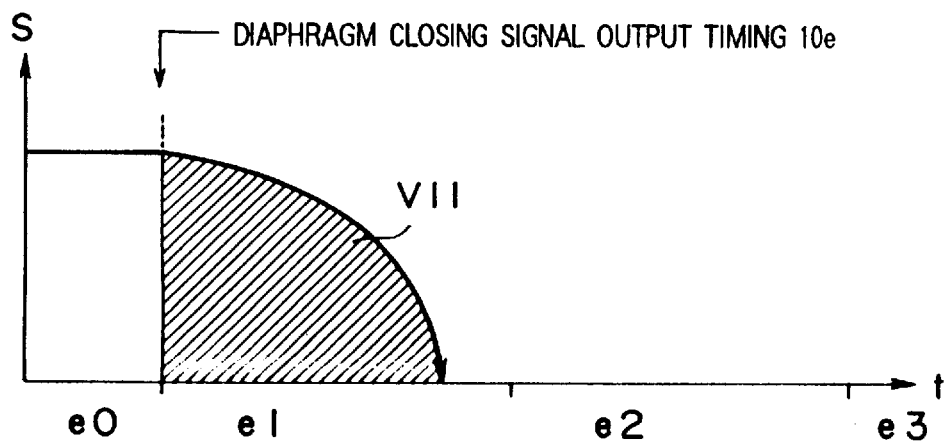
FIG. 25 is a view for graphically illustrating closing operation characteristic of an iris diaphragm used in an image pickup apparatus according to still another embodiment of the invention.

FIG. 25 is a view for graphically illustrating closing operation of a diaphragm, in which reference characters e0 to e3 designate fields, respectively, 10e designates a timing at which a diaphragm closing signal for triggering the closing operation of the iris diaphragm is issued, and V11 represents an amount of exposure determined by integrating the aperture area of the iris diaphragm as a function of time from the time point 10e to the closure of the iris diaphragm. For convenience of description, it is assumed that all the amounts of exposure from the start of closing of the iris diaphragm to the closure thereof are utilized.

Figure 26:
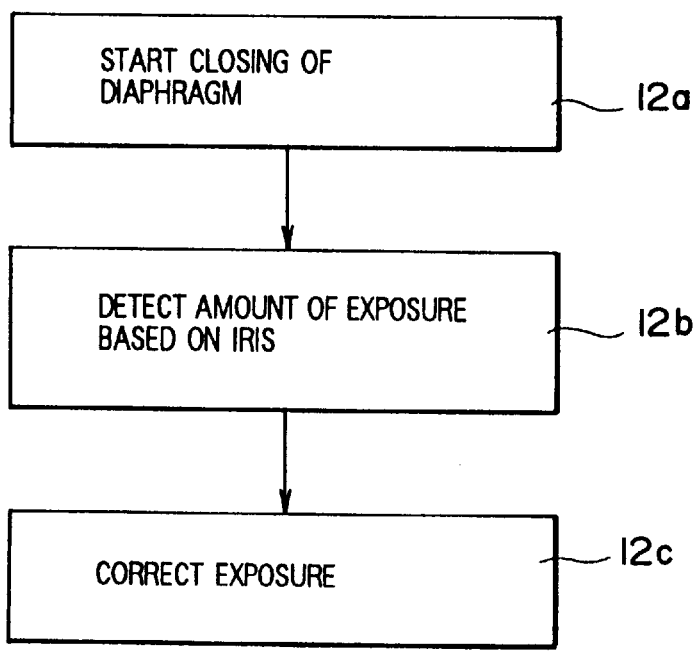
FIG. 26 is a flow chart for illustrating an exposure correcting processing according to an embodiment of the invention.

The exposure V11 will vary due to variations in the closing operation of the iris diaphragm. Since the amount of exposure itself is reflected straightforwardly onto the level of the video signal, it is possible to correct the video signal for the still picture by detecting the amount of exposure V11. FIG. 26 is a flow chart for illustrating, only by way of example, a correcting processing to this end. In a step 12a, measurement of the exposure amount V11 by the iris value detecting circuit 301 is started immediately after the time point 10e at which the iris diaphragm closing signal is outputted. In a step 12b, the amount of exposure is measured till the end of closure of the iris diaphragm. After closure of the iris diaphragm, variation or deviation of the exposure is determined on the basis of the measured amount of exposure V11 for correcting the level of the video signal as generated in a step 12c. More specifically, a signal gain control signal 212 is corrected correspondingly by the microcomputer 309 to thereby change the amplification factor for the output signal from the image sensor device 203 or for the video signal obtained by processing the output signal in the signal processing circuit 204.

The basic concept underlying the exposure correction is briefed above. However, there may be conceived a variety of methods for realizing the processings involved.

In general, the iris value detecting circuit 301 is so designed as to calculate the aperture area on the basis of the iris value outputted from the iris value outputted from the iris value detecting means and determine the amount of exposure V11 by integrating the aperture area in the course of closing of the iris diaphragm. For more details of the means for determining the amount of exposure and compensating for error contained therein, description will be made below in conjunction with twelfth to fourteenth embodiments of the invention.

Embodiment 12

Figure 27:
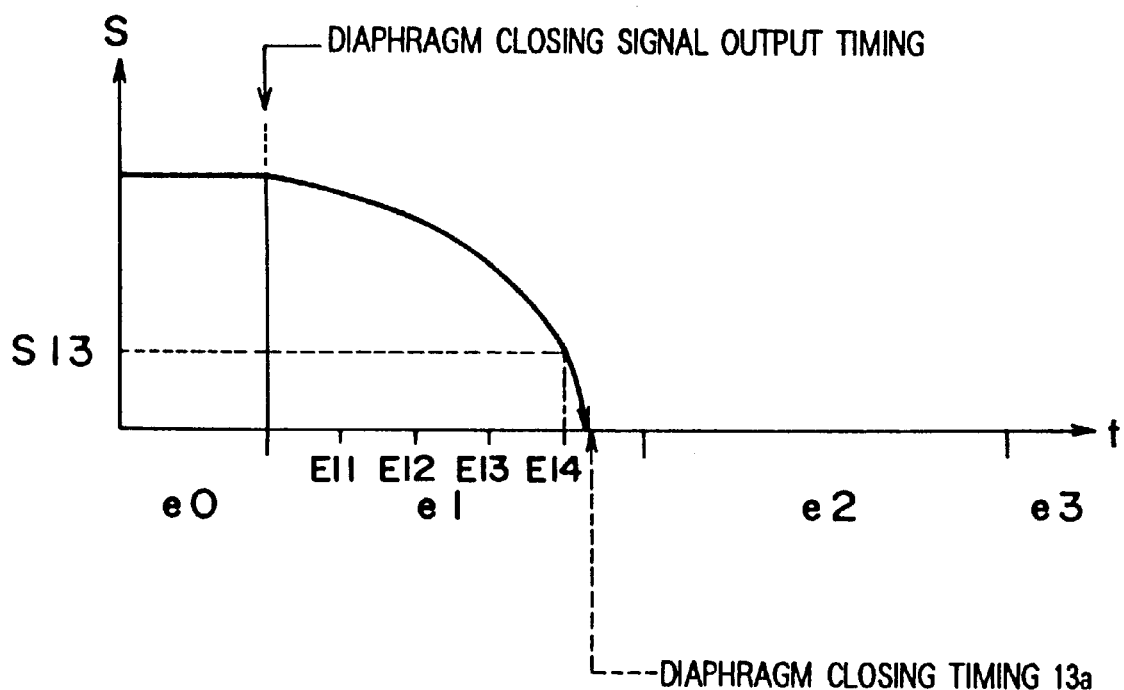
FIG. 27 is a view for illustrating graphically a method of detecting an amount of exposure according to a further embodiment of the invention.

The twelfth embodiment of the invention is directed to an arrangement for detecting the amount of exposure V11. This embodiment will be described by reference to FIG. 27 which illustrates graphically the closing operation of a diaphragm, similarly to FIG. 25. In FIG. 27, same symbols as those used in FIG. 25 have the same meanings as described previously. In the description which follows, it is assumed that the iris diaphragm is closed in the field e1.

As one method of detecting the amount of exposure V11, it is proposed to divide the filed e1 into several subperiods or intervals by time points E11 to E14, wherein the aperture area is determined for each of the intervals, respectively, and the amount of exposure V11 can then be determined as a summation of the aperture areas in the above-mentioned intervals, respectively.

In most cases, although the closing characteristic of a diaphragm may differ in respect to the closure timing (i.e., position along the time axis), the characteristic curve itself is substantially of a similar shape relative to the time axis. Accordingly, the amount of exposure V11 may be estimated by detecting the timing 13a. By way of example, let's assume that the closure timing 13a is detected as deviating by a % from the corresponding value of the iris diaphragm closure characteristic data stored in a memory incorporated in the microcomputer 309. This means that the shape of the characteristic curve of the exposure amount V11 extends additionally for a distance corresponding to the above-mentioned deviation. In other words, the amount of exposure V11 changes by a %. Thus, there exists a correspondence between the change in the closure timing 13a and that of the exposure amount V11. Accordingly, it is sufficient for correcting the video signal to make use of the rate of change in the iris diaphragm closure timing as detected.

Alternatively, the iris value at a specific timing (e.g. aperture area S13 at E14 ) may be detected to thereby estimate the closure timing 13a and the amount of exposure V11.

As the device for detecting the iris value, magneto resistance element or the like may be incorporated in a photometric type diaphragm driving mechanism, if adopted, as mentioned hereinafter, wherein the iris value is determined on the basis of the output from the magneto resistance element. Then, the amount of exposure V11 can be determined on the basis of the detected iris value in accordance with the method described above.

Embodiment 13

Next, an exemplary or typical method of correcting the video signal which is carried out in succession to determination of the amount of exposure V11 will be described as a thirteenth embodiment of the invention by reference to FIG. 24.

In the image pickup apparatus according to the instant embodiment, the signal correction is performed by using the gain control signal 212. At first, a sufficiently large signal gain for absorbing variations in the amount of exposure V11 appearing in positive and negative directions is set by the microcomputer 309. Subsequently, a still picture is taken and the amount of exposure V11 is detected. Subsequently, deviation of the detected amount of exposure from the normal value is arithmetically determined, and the gain control signal 212 is changed so as to cancel out the deviation. Thereafter, the video signal read out from the image sensor device 203 is outputted to the output terminal 207 as the still picture signal obtained with correct exposure.

As can be seen from the above, when the amount of exposure V11 is excessively large, the gain is deceased, while when the amount of exposure V11 is excessively small, the gain is increased, to thereby correct the variations in the amount of exposure.

Embodiment 14

Figure 28:
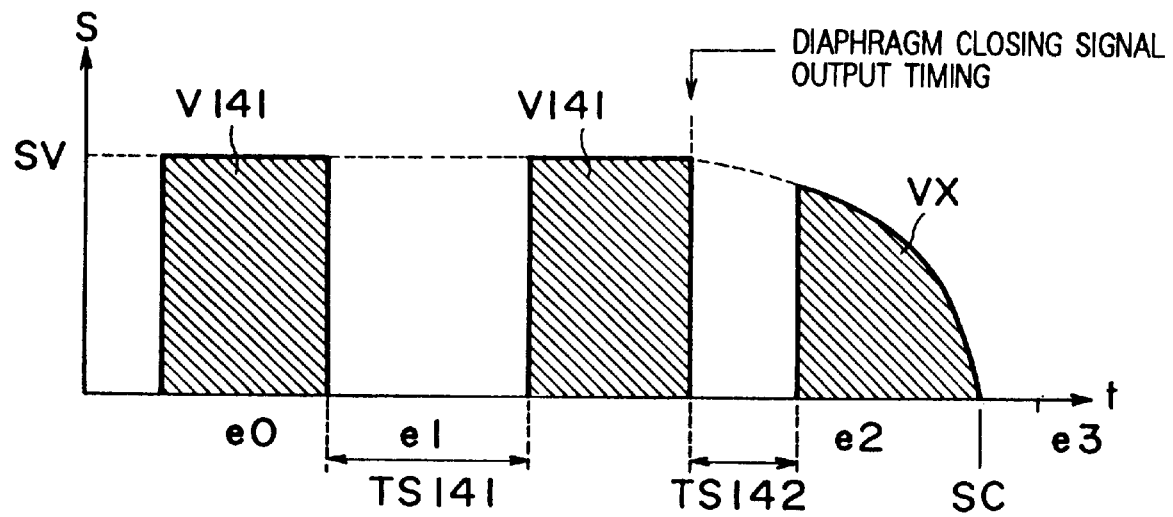
FIG. 28 is a view similar to FIG. 25 for illustrating graphically a closing operation of an iris diaphragm in an image pickup apparatus according to yet further embodiment of the invention.

Next, a fourteenth embodiment of the present invention will be described by reference to FIG. 28 and a table 1. The instant embodiment is directed to another exemplary method of correcting the amount of exposure. FIG. 28 is a view similar to FIG. 25 for illustrating graphically a closing operation of the iris diaphragm. In FIG. 28, same symbols as those used in FIG. 25 have same contents as described hereinbefore. The closing operation of the iris diaphragm illustrated in FIG. 28 differs from that shown in FIG. 25 in that the amount of exposure as required is smaller than that mentioned in conjunction with FIG. 25, i.e., the signal charges are swept out from the pixels of the image sensor device 203 after the start of closure of the iris diaphragm 202.

In FIG. 28, a symbol V141 represents an amount of exposure for taking a picture of an object in the motion picture imaging mode, and VX represents an amount of exposure for a still picture pickup operation. With the instant embodiment of the invention, it is contemplated to realize a proper exposure in the still picture pickup operation which is same as that in the motion picture imaging mode. Further, in FIG. 28, reference symbols TS141 and TS142 represent a charge sweep-out period (time) in the motion picture imaging mode and the still picture pickup mode, respectively. Finally, a symbol SV represents the aperture area of the iris diaphragm 202 in the motion picture imaging mode on the assumption that the iris diaphragm 202 is operating at a value Fa shown in FIG. 20.

As can be seen in FIG. 17, when the charge sweep-out operation is performed up to a time point on the way of closing of the iris diaphragm 202, there may arise such situation that the sufficient accuracy of correction can not be assured with the simple and convenient method illustrated in FIG. 25. Accordingly, in the case of the instant embodiment, there is adopted a method of correcting finely the closing operation characteristic data of the iris diaphragm 202. The following table 1 shows, by way of example only, the closing operation characteristic data of the iris diaphragm 202.

TABLE 1

| IRIS VALUE | EXPOSURE | SWEEP-OUT TIME | IRIS CLOSING TIME | CORRECT- ING QUANTITY |
|---|---|---|---|---|
| SV1 | VX11 | TS11 | SC11 | E11 |
|  | VX12 | TS12 | SC12 | E12 |
|  | VX13 | TS13 | SC13 | E13 |
|  | . . . | . . . | . . . | . . . |
| SV2 | VX21 | TS21 | SC21 | E21 |
|  | VX22 | TS22 | SC22 | E22 |
|  | VX23 | TS23 | SC23 | E23 |
| . . . | . . . | . . . | . . . | . . . |
|  | . . . | . . . | . . . | . . . |
|  | . . . | . . . | . . . | . . . |
|  | . . . | . . . | . . . | . . . |

From the above table 1, it will be seen that the amount of exposure in the closing operation of the iris diaphragm 202 can be determined on the basis of the charge sweep-out time TS, the iris diaphragm closing time point SC lapsed till the time point at which the iris diaphragm 202 is closed, and the correcting quantity E. More specifically, the correcting quantity E represents a variation in the amount of exposure when the iris diaphragm closing time point changes. On the basis of this correcting quantity E, the amount of exposure is corrected. These data are previously acquired by measurement for predetermined objects and stored.

The microcomputer 309 determines the amount of exposure (represented by VX22 in this case) for the still picture pickup on the on the basis of the iris value (represented by SV2 in this case) and the amount of exposure for the motion picture imaging operation and then determines the charge sweep-out time TS22 as well as the iris diaphragm closing time point SC22 on the basis of the amount of exposure VX22 as determined, whereby the conditions for the image sensor device can be determined. In accordance with the conditions, the iris diaphragm closing operation, the charge sweep-out operation, etc. are controlled by the microcomputer 309.

At the same time, the timing (indicated by 13a in FIG. 27) for closing the iris diaphragm 202 is estimated for thereby detecting the iris diaphragm closing time point. Then, deviations of the detected iris diaphragm closing time point from the time SC22 is determined. On the basis of this deviation and the correcting quantity E22, the actual correcting quantity is arithmetically determined. When a linear approximation is adopted for the correction, the correcting quantity may be defined as a rate of change of the amount of exposure for a unit change in the iris diaphragm closing time point. In that case, since a product of deviation in the iris diaphragm closing time point and the correcting quantity represents a correcting factor, the amount of exposure can be corrected through the procedure described previously.

Embodiment 15

Figure 29:
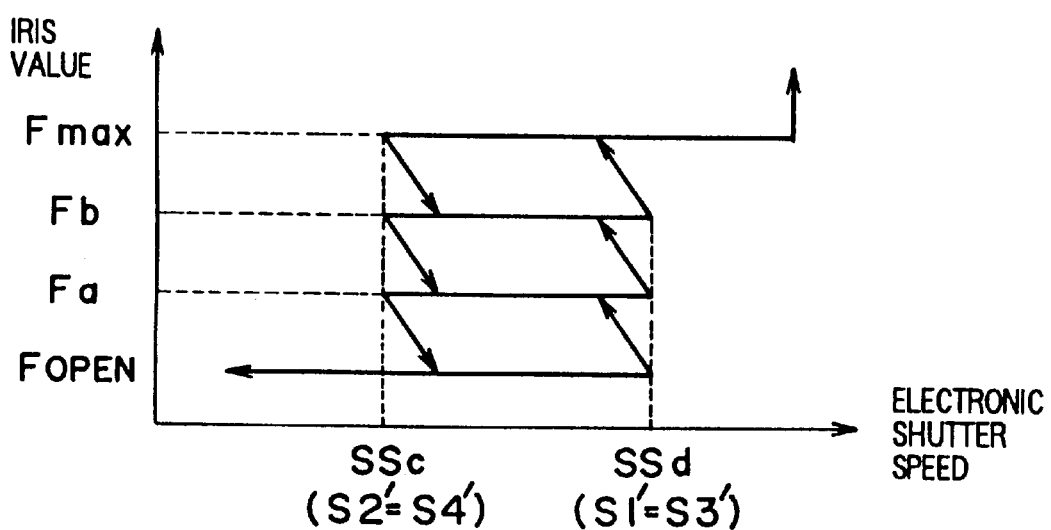
FIG. 29 is a view for graphically illustrating an exposure control characteristic in a motion picture imaging mode in an image pickup apparatus according to another embodiment of the invention.

Next, a fifteenth embodiment of the invention will be described by reference to FIG. 29. The instant embodiment is directed to an image pickup apparatus in which a programmed automatic exposure system is employed as in the case of the eighth embodiment described hereinbefore by reference to FIG. 20. More specifically, FIG. 29 is a view for graphically illustrating an exposure control characteristic in a motion picture imaging mode, wherein the iris value is taken along the ordinate with the electronic shutter speed being taken along the abscissa, The iris value and the electronic shutter speed are controlled and set in accordance with illuminance.

In the case of the image pickup apparatus according to the eighth embodiment, the electronic shutter speed is prevented from increasing in excess. However, when illuminance increases, the electronic shutter speed becomes higher to such a level where the exposure control is difficult to perform with high accuracy.

Further, when the iris diaphragm closing operation is started from the position where the iris or aperture diameter is small, the iris diaphragm closing time point becomes short, which result in that the electronic shutter speed for the still picture pickup increases even when the electric charge sweep-out period is not extended. Thus, it is safe to say that there exists for each of the iris values such a range of electronic shutter speeds for the still picture pickup in which the shutter speed as demanded can be obtained within a permissible range of error for the still picture pickup operation. A typical example of the motion picture imaging characteristics for such iris values as mentioned above is shown in FIG. 29.

More specifically, when the iris value increases to a certain level, a lowest shutter speed can be secured at least during the iris diaphragm closing time point. On the other hand, when a smaller aperture diameter of the iris diaphragm is used, increasing of the shutter speed becomes difficult.

Of course, it is self-explanatory that the programmed automatic exposure satisfying the optimal conditions is designed only after the design items such as the iris diaphragm closing operation characteristics and others have ultimately been determined.

The programmed automatic exposure is so designed as to realize properly and reasonably a high shutter speed. In designing the programmed automatic exposure, however, problems brought about by illumination and the like environmental conditions should preferably be taken into account. By way of example, under such environmental conditions in which a fluorescent lamp is used as an illumination source, there may make appearance flicker in the motion picture reconstructed on the monitor screen at a high electronic shutter speed, in dependence on the blinking frequency of the fluorescent lamp, the exposure timing and the exposure time.

By way of example, in European countries, the power supply for the fluorescent lamp has a frequency of 50 Hz.

Accordingly, assuming that the image pickup apparatus according to the invention is implemented in accordance with the NTSC standards and used in European countries, it can readily be understood that flickers will make appearance in the output motion picture at a frequency of 20 Hz which is a greatest common divisor of the blinking frequency of 100 Hz of the fluorescent lamp and the video signal field frequency of 60 Hz. Besides, when the charge store time in the CCD becomes shorter, the flicker becomes more eyesore.

By contrast, in U.S.A. the frequency of the power supply for the fluorescent lamp is 60 Hz and thus the blinking frequency thereof is 120 Hz. Accordingly, the flicker phenomenon does not usually take place.

However, when the electronic shutter speed becomes higher in the motion picture imaging mode with the charge store time becoming shorter, the field image frequency and the power supply frequency become different from each other in a strict sense. Thus, flicker components will be superposed on the video signal.

The flickers mentioned above will not take place in a still picture. However, they make appearance in the motion picture taken before the still picture. Since the video signal containing the flicker component can not ensure any satisfactory quality for the motion picture to be reconstructed, it goes without saying that the flicker should be suppressed.

Figure 30:
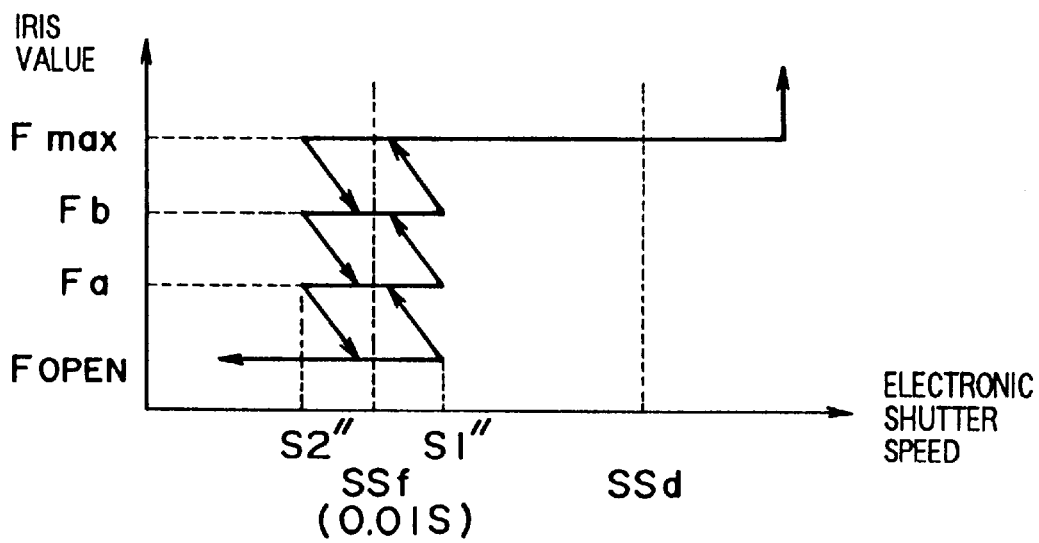
FIG. 30 is a view for graphically illustrating a programmed automatic exposure control in an image pickup apparatus according to yet another embodiment of the invention.

FIG. 30 is a view for graphically illustrating characteristics of an image pickup apparatus according to another embodiment of the invention which tackles the problems mentioned above.

More specifically, FIG. 30 is a program diagram which features that the electronic shutter speed is set around a center value SSf when compared with the program diagram shown in FIG. 29. When the power supply frequency for the fluorescent lamp is 50 Hz and the image pickup apparatus is of the NTSC standards, flicker is produced at a frequency of 15 Hz on the output video signal. However, since the blinking frequency of the fluorescent lamp is 100 Hz, the amount of exposure for every field becomes constant at a same level by setting the charge store time of the image sensor device 203 at $\frac{1}{100}$ sec. This time corresponds to the electronic shutter speed SSf. By performing the exposure control in accordance with the program shown in FIG. 30, the electronic shutter speed changes in accompanying changes in illuminance of the object. When the electronic shutter speed coincides with the value SSf, the flicker is suppressed while it makes appearance as the deviation in the electronic shutter speed from the value SSf increases. Thus, it is possible to suppress to a minimum the generation of the flicker by reducing the deviation mentioned above.

In this conjunction, difference or distance between the electronic shutter speeds S1" and S2" shown in FIG. 30 should desirably be set to a value not greater than 0.015 sec. by setting the exposure control shutter speeds S1" and S2" to, for example, $\frac{1}{50}$ sec. and $\frac{1}{200}$ sec., respectively, although it depends on selection of the iris value. By further decreasing the difference or distance between the shutter speeds mentioned above, the flicker suppression can be realized more effectively. However, because then the number of preset iris values has to be increased by additionally providing iris values Fc, Fd, and so fourth, compromise must be made between the suppression of the flicker and the expensiveness or complexity brought about by adding the preset iris values.

When the still picture is taken in accordance with the programmed automatic exposure shown in FIG. 30, the electronic shutter speed is rather slow. Accordingly, the shutter speed in the still picture pickup operation does not increase.

Under the circumstances, it is decided by the microcomputer 309 shown in FIG. 24 whether the signal information 213 inputted to the microcomputer 309 varies periodically, indicating generation of flickers. When it is decided by the microcomputer 309 that no flicker occurs, the exposure control is performed in accordance with the programmed automatic exposure control scheme illustrated in FIG. 29. On the contrary, when flicker takes place, the exposure control is performed in accordance with the programmed automatic exposure control scheme shown in FIG. 30. In this way, still picture of satisfactory quality can be generated at a proper shutter speed regardless of differences of the illumination conditions.

Incidentally, it should be mentioned in conjunction with the two programmed automatic exposure control schemes that a specific iris value is determined at a specific illuminance value. Accordingly, when the two programmed automatic exposure controls are changed over, the iris value should be gradually changed so as to assume a relevant value while at the same time the electronic shutter speed should be changed so that the amount of exposure does not vary. In this way, disturbance or fluctuation of the picture which may otherwise occur upon changing-over of the programmed automatic exposure controls mentioned above can be avoided.

Once the programmed automatic exposure control illustrated in FIG. 30 is put into effect under fluorescent lamp illumination, flicker components are excluded from the video signals outputted from the image sensor device 203. In that case, it becomes difficult to decide whether there prevails situation in which the flicker may take place due to illuminance of the object.

However, photographing of a given scene with the image pickup apparatus will be usually performed either indoor or outdoor from the beginning to the end in most cases. Accordingly, the programmed automatic exposure control illustrated in FIG. 29 is first adopted, and when flicker is detected in this exposure control mode, then the former is changed over to the programmed automatic exposure control illustrated in FIG. 30. In this way, flicker can be suppressed adequately.

Reversely, the programmed automatic exposure control shown in FIG. 30 may be first validated. Thereafter, when it becomes unnecessary to suppress the flicker because of change of illumination, the programmed automatic exposure control shown in FIG. 29 may be put into effect so that the still picture can be taken at a high shutter speed, although this procedure requires more or less higher camera manipulation technique.

In the case mentioned just above, it is necessary to detect with high reliability whether the prevailing situations or conditions are likely to incur generation of the flicker. To this end, a sensor for detecting a periodical change of the illumination may be provided separately and the output of this sensor is supplied to the microcomputer 309 for allowing it to decide whether or not the prevailing state of illumination or photographing conditions in a more general sense provides a cause for generation of the flicker phenomenon.

As an another embodiment, once the programmed automatic exposure control illustrated in FIG. 30 is put into effect, it may be possible to determine whether the fluorescent lamp illumination is in a condition that generates the flicker by detecting a flicker component after shifting the shutter speed from the value SSf to a little faster value or lower value.

In this conjunction, when the electronic shutter speed is deviated from the value SSf, it is sufficient to detect merely whether or not the flicker is being generated. However, in case the electronic shutter speed is at the value SSf or close thereto, it is required to change advertently the electronic shutter speed. In that case, detection of the flicker ascribable to advertent change of the electronic shutter speed should preferably be performed every time the intensity of illumination changes or periodically at a predetermined time interval so that any appreciable influence is not exerted to the output video signal and hence to the reconstructed motion picture.

Needless to say, the signal processing circuit 204 itself may be provided with a variable gain circuit for lowering the gain of the signal processing circuit 204 when the signal quantity is large while increasing the gain when the signal quantity is small, for cancelling out the flicker. In that case, however, when the frequency at which flicker is generated increases as the electronic shutter speeds increases, change of the gain for cancelling out the flicker increases correspondingly, incurring problems such as degradation in the S/N ratio. Thus, it goes without saying that even when the flicker is to be cancelled out by using the circuit dedicated to this end, generation of the flicker should previously be suppressed to a low level by controlling appropriately the electronic shutter speed.

Besides, it is possible to combine the programmed automatic exposure control illustrated in FIG. 29 with that of FIG. 30 according to a further embodiment of the present invention.

In general, the illumination blinking periodically and giving rise to generation of flicker is an artificial illumination of which illuminance is usually low. Accordingly, with the combination of the programmed automatic exposure controls shown in FIGS. 29 and 30, it is contemplated to realize control the automatic exposure by controlling the electronic shutter speed with reference to the value SSf for suppressing the flicker up to a certain level of illuminance while the electronic shutter speed is controlled with reference to the electronic shutter speed SSt at high illuminance, to thereby generate a still picture at a high shutter speed. At this juncture, it should also be mentioned that the shutter speed SSt is set at a value a which the picture as taken is not effected by the camera shake. In practical applications, the shutter speed SSt should be selected around 1/200 sec., although it may vary in dependence on the F-value of the lens system as well as the specification of the video camera of concern.

In the foregoing, the iris or aperture-priority programmed exposure control has been described. However, the present invention is never restricted to such electronic control. By way of example, a programmed automatic control exposure adopted in so-called film cameras may equally be employed in taking the motion picture.

However, in the still picture pickup mode of the image pickup apparatus according to the instant embodiment of the invention, it is difficult to realize a very high shutter speed only for the exposure immediately before closure of the iris diaphragm 202 because of variation in the iris closure time point. Thus, the electronic shutter speed can not be increased arbitrarily as desired, as pointed out previously. Thus, in the case of the image pickup apparatus according to the instant embodiment of the invention, it is necessary to take into account the limitation imposed on the electronic shutter speed. For this reason, it is impracticable to set arbitrarily the programmed automatic exposure, differing from the so-called film camera.

Figure 32:
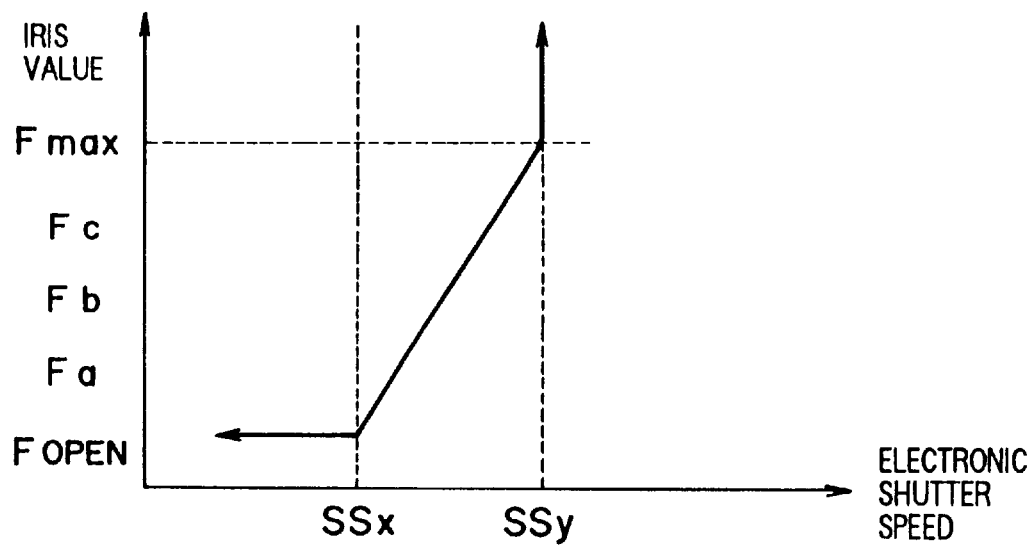
FIG. 32 is a view for illustrating graphically a programmed automatic exposure control according to a further embodiment of the invention.

FIG. 32 is a view for illustrating graphically a programmed automatic exposure control according to yet another embodiment of the invention. Referring to the figure, the exposure control is performed with the iris and the shutter speed set as indicated in the figure from the electronic shutter speeds SSx to SSy selected arbitrarily.

In the case of the exposure control in the still picture pickup mode according instant embodiment of the invention, iris diaphragm closing characteristics are previously measured from several iris values on the diaphragm, whereon the charge sweep-out time for the image sensor device 203 is determined for the exposure control. The other sweep-out time points can be determined through interpolation, needless to say.

Figure 33:
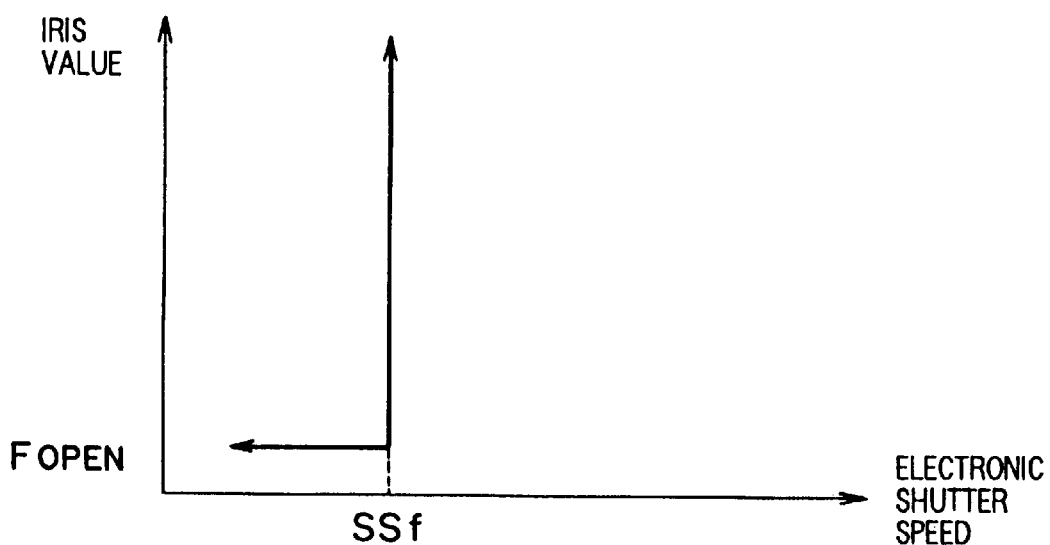
FIG. 33 is a view for graphically illustrating a programmed automatic exposure control for suppressing generation of flicker in an image pickup apparatus according to yet further embodiment of the invention.

FIG. 33 is a view for graphically illustrating a programmed automatic exposure control effectuated upon detection of flicker. In this case, because the change-over of the controls between the states shown in FIGS. 32 and 33 is essentially same as the control described previously in conjunction with FIG. 30, repeated description thereof will be unnecessary.

Figure 31:
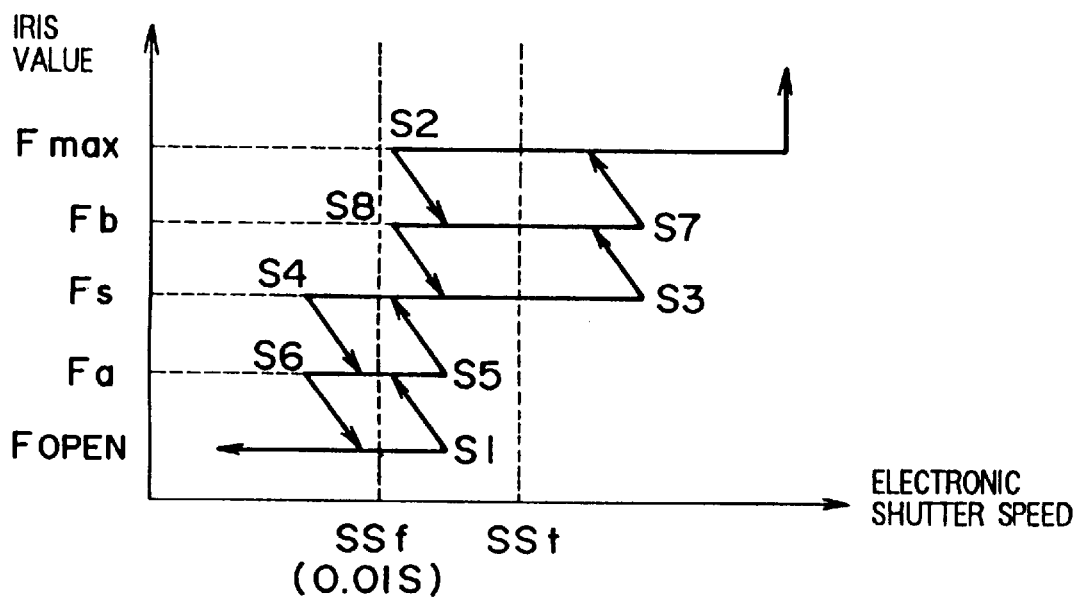
FIG. 31 is a view for graphically illustrating a programmed automatic exposure control in an image pickup apparatus according to still another embodiment of the invention.
Figure 34:
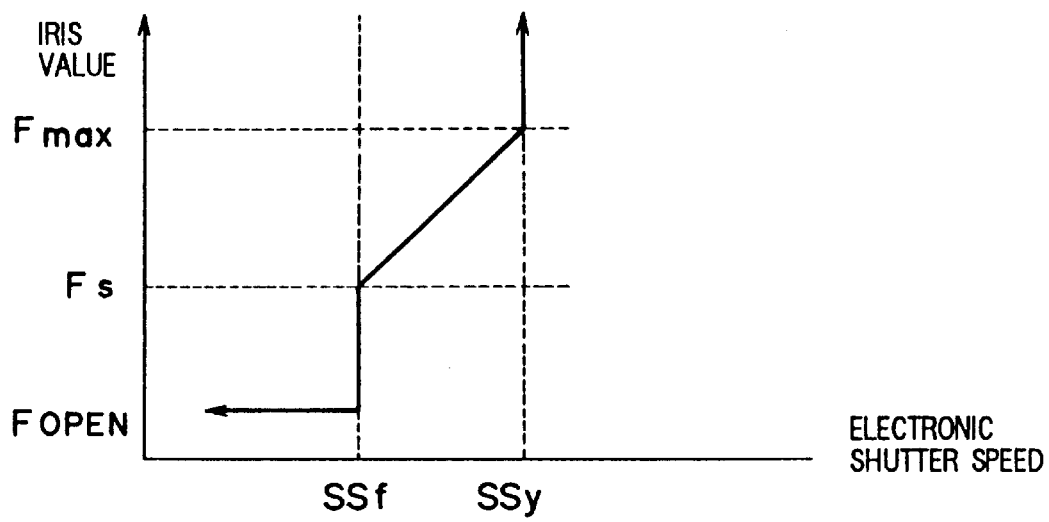
FIG. 34 is a view for illustrating graphically a programmed automatic exposure control according to still further embodiment of the invention.

Of course, the programmed automatic exposure control may be executed by combining the programmed automatic exposure controls shown in FIGS. 32 and 33, as illustrated in FIG. 34. However, description thereof will be unnecessary because it is self-explanatory from the description made in conjunction with the programmed automatic exposure control illustrated in FIG. 31.

Figure 35:
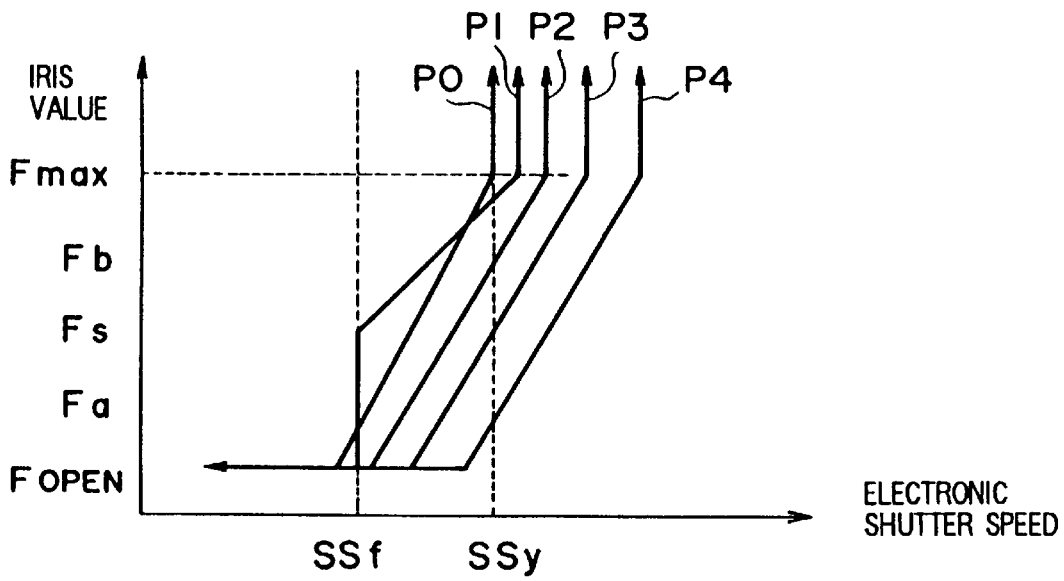
FIG. 35 is a view for illustrating graphically a programmed automatic exposure control according to yet further embodiment of the invention.

Further, it is obvious that a variety of programmed automatic exposure control procedures may previously be prepared, as is illustrated in FIG. 35, so that the photographer can select a proper one. More specifically, referring to FIG. 35, there are prepared beforehand a variety of programmed automatic exposure control procedures P0 to P4 inclusive of the aforementioned programmed automatic exposure control. Thus, by selecting simply the program P1, it is possible to pick up the still picture without any difficulty. Thus, easiness in manipulating the image pickup apparatus can further be enhanced.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it has been described that correction of the amount of exposure is performed by controlling the gain of the signal processing circuit, the corresponding correcting quantities may be once stored in a memory or the like to be used subsequently for the correction of the amount of exposure.

Further, although it has been assumed in the foregoing description that the timing for starting the closure of the iris diaphragm is generated in every vertical synchronizing signal period, the same can be generated immediately after read-out of signal charge from the pixels unless the charge sweep-out operation is performed as the electronic shutter function for the image sensor device. In the case of the interline type CCD image sensor, the closure of the iris diaphragm may be started immediately after the transfer of electric charges to the vertical CCDs.

The foregoing description has been made on the basis of the aperture area of the iris diaphragm for indicating the state thereof. However, this is only for convenience of the description. The contemplated control may be carried out without any difficulty by using the iris value itself so long as correspondences between the iris values and the amount of exposures have previously been estimated.

Besides, various embodiments of the invention described in the foregoing may appropriately be combined together for achieving the objects of the invention.

In any case, according to the invention, it is possible to realize inexpensively an image pickup apparatus of a small size which can generate compatibly both motion and still pictures by using an iris diaphragm employed in a conventional video camera.

Accordingly, all suitable modifications and equivalents may be resorted to, falling within the spirit and scope of the invention.

What is claimed is:

1. An electronic camera which enables imaging a moving picture and a still picture, comprising:
    a diaphragm which intercepts partially or wholly incident light, said diaphragm being closed when imaging said still picture;
    an image sensor device which converts said incident light focused thereon into an electric signal;
    an image sensor driving circuit which drives said image sensor device;
    a signal processing circuit which processes the electric signal outputted from said image sensor device; and
    a control circuit which controls said diaphragm and said image sensor driving circuit according to an amount of exposure determined based on a luminance signal outputted from said signal processing circuit;
    wherein said control circuit determines an amount of exposure for imaging said still picture based on an amount of exposure determined during imaging said moving picture, and controls said diaphragm to close from a last aperture of imaging said moving picture.

2. An electronic camera apparatus according to claim 1, wherein said control circuit controls said diaphragm to be opened widely when imaging said moving picture.

3. An electronic camera apparatus according to claim 2, wherein said image sensor driving circuit drives said image sensor device to sweep out the charges at a given timing and drives said image sensor device to sweep out the electronic charges at starting of a closing operation of said diaphragm.

4. An electronic camera apparatus according to claim 2, wherein said image sensor driving circuit drives said image sensor device to sweep out the charges at a given timing and said control circuit controls said diaphragm to maintain the aperture during a field after sweeping out of the electronic charges from said image sensor device.

5. An electronic camera apparatus according to claim 2, wherein said image sensor driving circuit drives said image sensor device to sweep out the charges at a given timing and drives said image sensor device to sweep out the electronic charges during a closing operation of said diaphragm.

6. An electronic camera which enables imaging a moving picture and a still picture, comprising:
    a diaphragm which intercepts partially or wholly incident light, said diaphragm being closed when imaging said still picture;
    a diaphragm control circuit which controls said diaphragm;
    an image sensor device which converts said incident light focused thereon into an electric signal;
    an image sensor driving circuit which drives said imaging sensor device;
    a signal processing circuit which processes the electric signal outputted from said image sensor device;
    a shutter button which initiates starting of imaging said still picture; and
    a control circuit which controls said diaphragm and said image sensor driving circuit according to an amount of exposure determined based on a luminance signal outputted from said signal processing circuit;
    wherein said control circuit determines an amount of exposure for imaging said still picture based on an amount of exposure determined during imaging said moving picture, and said control circuit maintains a last aperture of imaging said motion picture from operation of said shutter button to a next field.

7. An electronic camera apparatus according to claim 6, wherein said control circuit controls said diaphragm to be opened widely when imaging said moving picture.

8. An electronic camera apparatus according to claim 7, wherein said image sensor driving circuit drives said image sensor device to sweep out the charges at a given timing and drives said image sensor device to sweep out the electronic charges at starting of a closing operation of said diaphragm.

9. An electronic camera apparatus according to claim 7, wherein said image sensor driving circuit drives said image sensor device to sweep out the charges at a given timing and said control circuit controls said diaphragm to maintain the aperture during a field after sweeping out of the electronic charges from said image sensor device.

10. An electronic camera apparatus according to claim 7, wherein said image sensor driving circuit drives said image sensor device to sweep out the charges at a given timing and drives said image sensor device to sweep out the electronic charges during a closing operation of said diaphragm.

11. An electronic camera which enables imaging a moving picture in a moving picture mode and a still picture in a still picture mode, comprising:
    a diaphragm which intercepts partially incident light in the moving picture mode, said diaphragm being closed in said still picture mode;
    an image sensor device which converts said incident light focused thereon into an electric signal;
    an image sensor driving circuit which drives said imaging sensor device;
    a signal processing circuit which processes the electric signal outputted from said image sensor device;
    a shutter button which initiates starting of imaging said still picture; and
    a control circuit which controls said diaphragm and said image sensor driving circuit according to an amount of exposure determined based on a luminance signal outputted from said signal processing circuit in said moving picture mode;
    wherein said control circuit determines an amount of exposure for imaging said still picture based on an amount of exposure measured in said moving picture mode, and controls said diaphragm to close from a last aperture of said moving picture mode when said moving picture mode is changed to said still picture mode by operation of said shutter button.

12. An electronic camera apparatus according to claim 11, wherein said control circuit controls said diaphragm to be opened widely when imaging said moving picture.

13. An electronic camera apparatus according to claim 12, wherein said image sensor driving circuit drives said image sensor device to sweep out the charges at a given timing and drives said image sensor device to sweep out the electronic charges at starting of a closing operation of said diaphragm.

14. An electronic camera apparatus according to claim 12, wherein said image sensor driving circuit drives said image sensor device to sweep out the charges at a given timing and said control circuit controls said diaphragm to maintain the aperture during a field after sweeping out of the electronic charges from said image sensor device.

15. An electronic camera apparatus according to claim 12, wherein said image sensor driving circuit drives said image sensor device to sweep out the charges at a given timing and drives said image sensor device to sweep out the electronic charges during a closing operation of said diaphragm.

16. A method of controlling an electronic camera which enables imaging a moving picture and a still picture, wherein the electronic camera includes a diaphragm which intercepts partially or wholly incident light, said diaphragm being closed when imaging said still picture, an image sensor device which converts said incident light focused thereon into an electric signal, an image sensor driving circuit which drives said image sensor device, a signal processing circuit which processes the electric signal outputted from said image sensor device, and a control circuit, the method comprising the steps of:

controlling said diaphragm and said image sensor driving circuit according to an amount of exposure determined based on a luminance signal outputted from said signal processing circuit;

determining an amount of exposure for imaging said still picture based on an amount of exposure determined during imaging said moving picture; and controlling said diaphragm to close from a last aperture of imaging said moving picture.

17. A method according to claim 16, further comprising the step of widely opening said diaphragm when imaging said moving picture.

18. A method according to claim 17, further comprising the steps of driving said image sensor device to sweep out the charges at a given timing and driving said image sensor device to sweep out the electronic charges at starting of a closing operation of said diaphragm.

19. A method according to claim 17, further comprising the steps of driving said image sensor device to sweep out the charges at a given timing and controlling said diaphragm to maintain the aperture during a field after sweeping out of the electronic charges from said image sensor device.

20. A method according to claim 17, further comprising the steps of driving said image sensor device to sweep out the charges at a given timing and driving said image sensor device to sweep out the electronic charges during a closing operation of said diaphragm.

21. A method of controlling an electronic camera which enables imaging a moving picture and a still picture, wherein the electronic camera includes a diaphragm which intercepts partially or wholly incident light, said diaphragm being closed when imaging said still picture, a diaphragm control circuit which controls said diaphragm, an image sensor device which converts said incident light focused thereon into an electric signal, an image sensor driving circuit which drives said imaging sensor device, a signal processing circuit which processes the electric signal outputted from said image sensor device, a shutter button which initiates starting of imaging said still picture, and a control circuit, the method comprising the steps of:

controlling said diaphragm and said image sensor driving circuit according to an amount of exposure determined based on a luminance signal outputted from said signal processing circuit;

determining an amount of exposure for imaging said still picture based on an amount of exposure determined during imaging said moving picture; and maintaining a last aperture of imaging said motion picture from operation of said shutter button to a next field.

22. A method according to claim 21, further comprising the step of widely opening said diaphragm when imaging said moving picture.

23. A method according to claim 22, further comprising the steps of driving said image sensor device to sweep out the charges at a given timing and driving said image sensor device to sweep out the electronic charges at starting of a closing operation of said diaphragm.

24. A method according to claim 22, further comprising the steps of driving said image sensor device to sweep out the charges at a given timing and controlling said diaphragm to maintain the aperture during a field after sweeping out of the electronic charges from said image sensor device.

25. A method according to claim 22, further comprising the steps of driving said image sensor device to sweep out the charges at a given timing and driving said image sensor device to sweep out the electronic charges during a closing operation of said diaphragm.

26. A method of controlling an electronic camera which enables imaging a moving picture in a moving picture mode and a still picture in a still picture mode, wherein the electronic camera includes a diaphragm which intercepts partially incident light in the moving picture mode, said diaphragm being closed in said still picture mode, an image sensor device which converts said incident light focused thereon into an electric signal, an image sensor driving circuit which drives said imaging sensor device, a signal processing circuit which processes the electric signal outputted from said image sensor device, a shutter button which initiates starting of imaging said still picture, and a control circuit, the method comprising the steps of:

controlling said diaphragm and said image sensor driving circuit according to an amount of exposure determined based on a luminance signal outputted from said signal processing circuit in said moving picture mode;

determining an amount of exposure for imaging said still picture based on an amount of exposure measured in said moving picture mode; and controlling said diaphragm to close from a last aperture of said moving picture mode when said moving picture mode is changed to said still picture mode by operation of said shutter button.

27. A method according to claim 26, further comprising the step of widely opening diaphragm when imaging said moving picture.

28. A method according to claim 27, further comprising the steps of driving said image sensor device to sweep out the charges at a given timing and driving said image sensor device to sweep out the electronic charges at starting of a closing operation of said diaphragm.

29. A method according to claim 27, further comprising the steps of driving said image sensor device to sweep out the charges at a given timing and controlling said diaphragm to maintain the aperture during a field after sweeping out of the electronic charges from said image sensor device.

30. A method according to claim 27, further comprising the steps of driving said image sensor device to sweep out the charges at a given timing and driving said image sensor device to sweep out the electronic charges during a closing operation of said diaphragm.

* * * * *